(12) United States Patent
Ehrenberg et al.

(10) Patent No.: US 11,708,809 B2
(45) Date of Patent: Jul. 25, 2023

(54) NON-CYLINDRICAL FILTER AND SIDE ENTRY AIR CLEANER INCORPORATING THE SAME

(71) Applicants: Brian T. Ehrenberg, Kansas City, MO (US); John Nichols, Oxford, MS (US); Randel D. Harbur, Piperton, TN (US); James Ray Manley, Myrtle, MS (US); Jeffrey Dufour, Olive Branch, MS (US)

(72) Inventors: Brian T. Ehrenberg, Kansas City, MO (US); John Nichols, Oxford, MS (US); Randel D. Harbur, Piperton, TN (US); James Ray Manley, Myrtle, MS (US); Jeffrey Dufour, Olive Branch, MS (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 0 days.

(21) Appl. No.: 17/730,351

(22) Filed: Apr. 27, 2022

(65) Prior Publication Data
US 2022/0252027 A1    Aug. 11, 2022

Related U.S. Application Data

(62) Division of application No. 16/266,988, filed on Feb. 4, 2019, now abandoned.
(Continued)

(51) Int. Cl.
*F02M 35/024* (2006.01)
*B01D 46/00* (2022.01)

(52) U.S. Cl.
CPC ... *F02M 35/02425* (2013.01); *B01D 46/0004* (2013.01); *B01D 46/0009* (2013.01);
(Continued)

(58) Field of Classification Search
CPC ....... F02M 35/02425; F02M 35/02433; F02M 35/0245; F02M 35/02491; B01D 46/0004;
(Continued)

(56) References Cited

U.S. PATENT DOCUMENTS 1,437,509 A * 12/1922 Genth .................... A47B 95/02
16/416
4,410,427 A    10/1983 Wydeven
(Continued)

FOREIGN PATENT DOCUMENTS

DE    102015009535 A1    2/2017
DE    102017001268 A1    9/2017
(Continued)

OTHER PUBLICATIONS

U.S. Appl. No. 16/266,988, filed Feb. 4, 2019.

*Primary Examiner* — Robert A Hopkins
*Assistant Examiner* — Qianping He
(74) *Attorney, Agent, or Firm* — Reinhart Boerner Van Deuren P.C.

(57) ABSTRACT

A filter element is provided that is preferably a side entry air filter having an air filter media pack, a housing seal and a frame that has a clamping projection, a pivot projection and/or guide members. The clamping projection can define a non-linear bearing surface that may be chevron shaped to provide for interface and potential alignment benefits. The housing seal may be a wave seal that undulates.

20 Claims, 15 Drawing Sheets

Related U.S. Application Data

(60) Provisional application No. 62/723,582, filed on Aug. 28, 2018.

(52) U.S. Cl.
CPC ..... B01D 46/0015 (2013.01); F02M 35/0245 (2013.01); F02M 35/02433 (2013.01); F02M 35/02491 (2013.01); B01D 2265/028 (2013.01)

(58) Field of Classification Search
CPC ............ B01D 46/0009; B01D 46/0015; B01D 2265/028
USPC .......................................................... 55/492
See application file for complete search history.

(56) References Cited

U.S. PATENT DOCUMENTS

| | | | |
|---|---|---|---|
| 6,568,540 B1* | 5/2003 | Holzmann | B01D 29/016 |
| | | | 55/497 |
| 7,323,029 B2 | 1/2008 | Engelland et al. | |
| 7,396,375 B2 | 7/2008 | Nepsund et al. | |
| 7,655,074 B2 | 2/2010 | Nepsund et al. | |
| 7,682,416 B2 | 3/2010 | Engelland et al. | |
| 7,905,936 B2 | 3/2011 | Coulonvaux et al. | |
| 8,048,188 B2 | 11/2011 | Widerski et al. | |
| 8,246,702 B2 | 8/2012 | Ackermann et al. | |
| 8,882,874 B1 | 11/2014 | Cross | |
| 8,916,044 B2 | 12/2014 | Rapin | |
| 10,632,410 B2 | 4/2020 | Dewit et al. | |
| 2008/0010958 A1 | 1/2008 | Fester et al. | |
| 2008/0250763 A1* | 10/2008 | Widerski | B01D 46/525 |
| | | | 55/357 |
| 2010/0186353 A1 | 7/2010 | Ackermann et al. | |
| 2012/0124947 A1 | 5/2012 | Dewit et al. | |
| 2012/0181224 A1* | 7/2012 | Rapin | B01D 35/153 |
| | | | 210/232 |
| 2014/0251895 A1 | 9/2014 | Wagner | |
| 2014/0260139 A1 | 9/2014 | Merritt et al. | |
| 2015/0107200 A1 | 4/2015 | Menssen et al. | |
| 2016/0236128 A1 | 8/2016 | Campbell et al. | |
| 2017/0095761 A1 | 4/2017 | Knight et al. | |
| 2017/0096973 A1* | 4/2017 | Kaufmann | B01D 46/522 |
| 2017/0304760 A1 | 10/2017 | Kaufmann et al. | |
| 2018/0214806 A1 | 8/2018 | Tate et al. | |
| 2018/0363598 A1* | 12/2018 | Ruhland | B01D 46/0005 |
| 2018/0372036 A1 | 12/2018 | Von Seggern et al. | |
| 2019/0046915 A1* | 2/2019 | Gieseke | B01D 46/527 |
| 2020/0072169 A1 | 3/2020 | Ehrenberg et al. | |

FOREIGN PATENT DOCUMENTS

| | | |
|---|---|---|
| EP | 1520975 A2 | 4/2005 |
| WO | WO 2006/009766 A1 | 1/2006 |
| WO | WO 2017/079191 A1 | 5/2017 |
| WO | WO 2017/099984 A1 | 6/2017 |
| WO | WO 2017/133797 A1 | 8/2017 |
| WO | WO 2018/152090 A1 | 8/2018 |

* cited by examiner

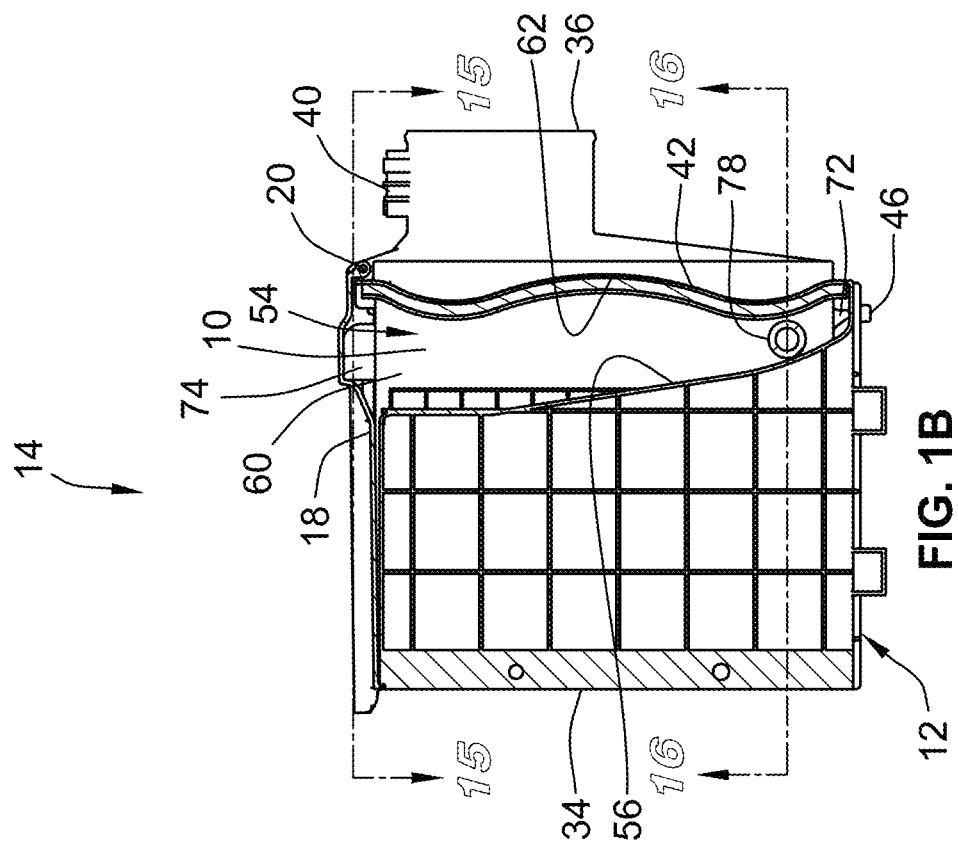
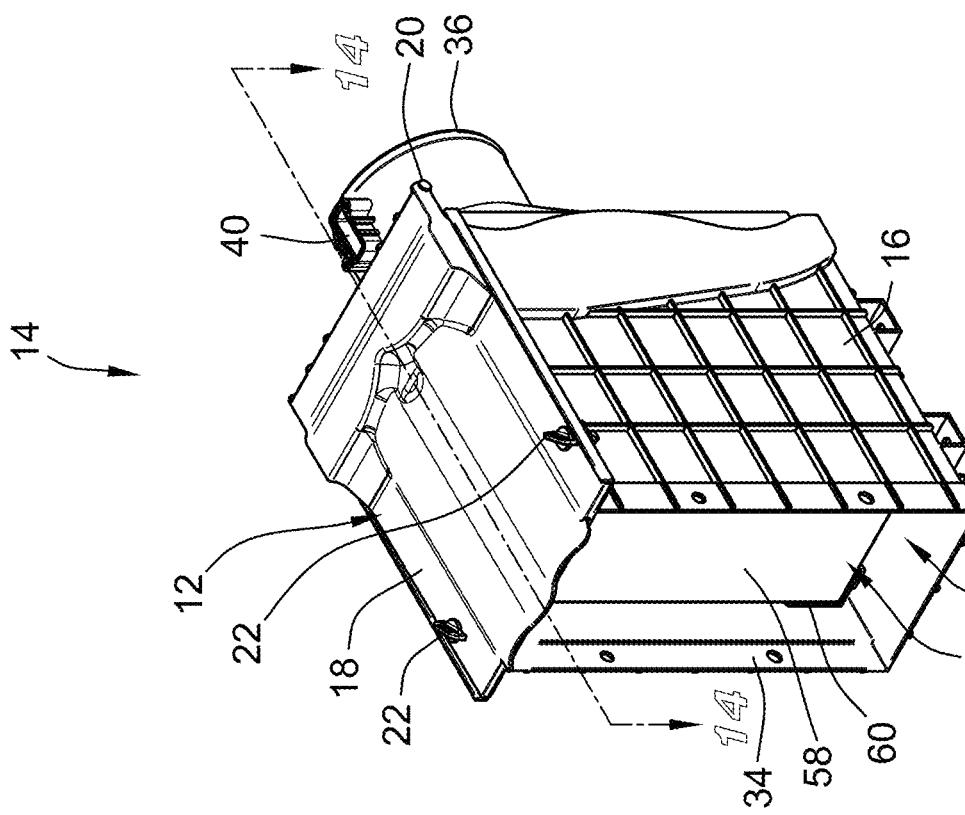
FIG. 1B
FIG. 1A

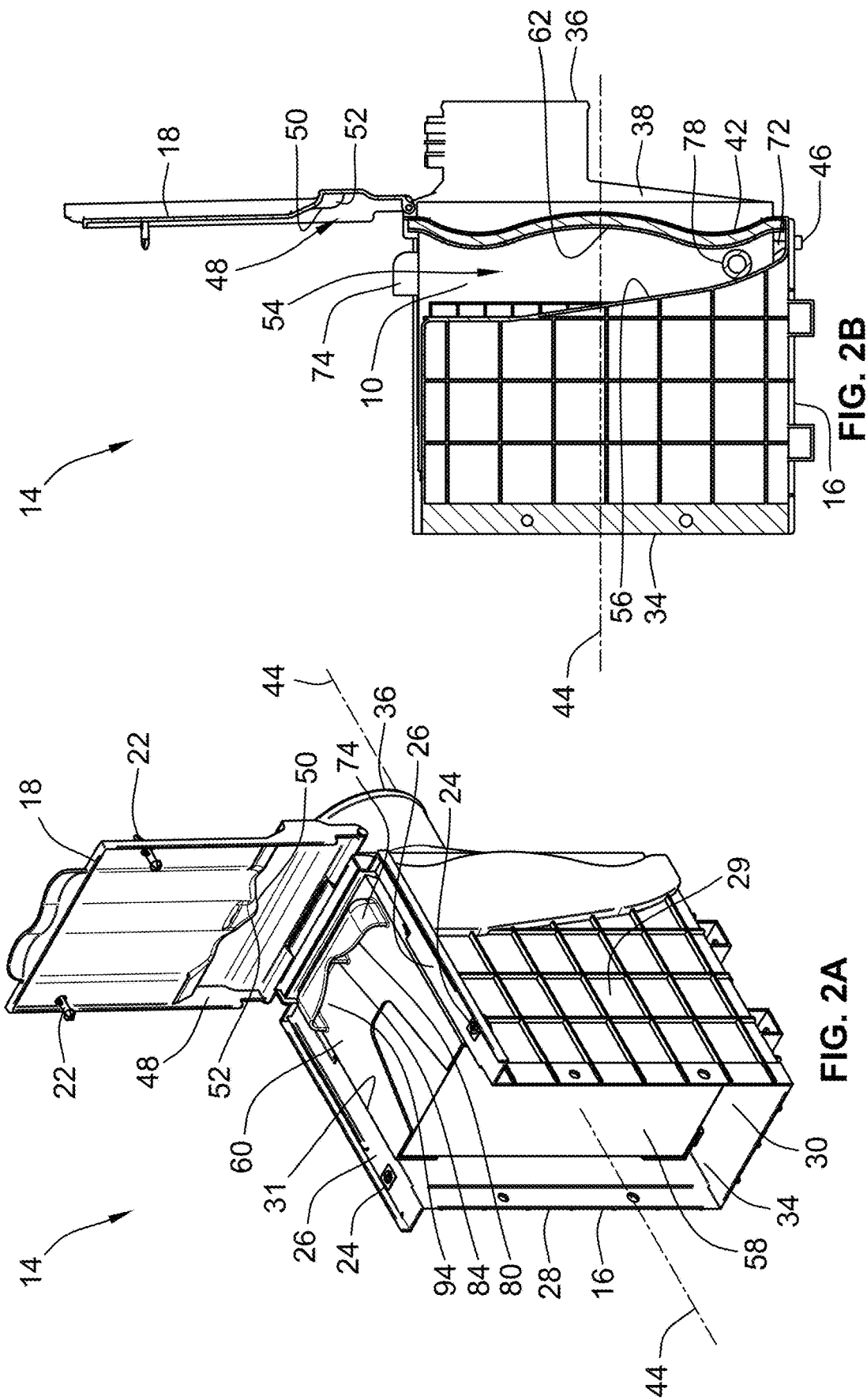

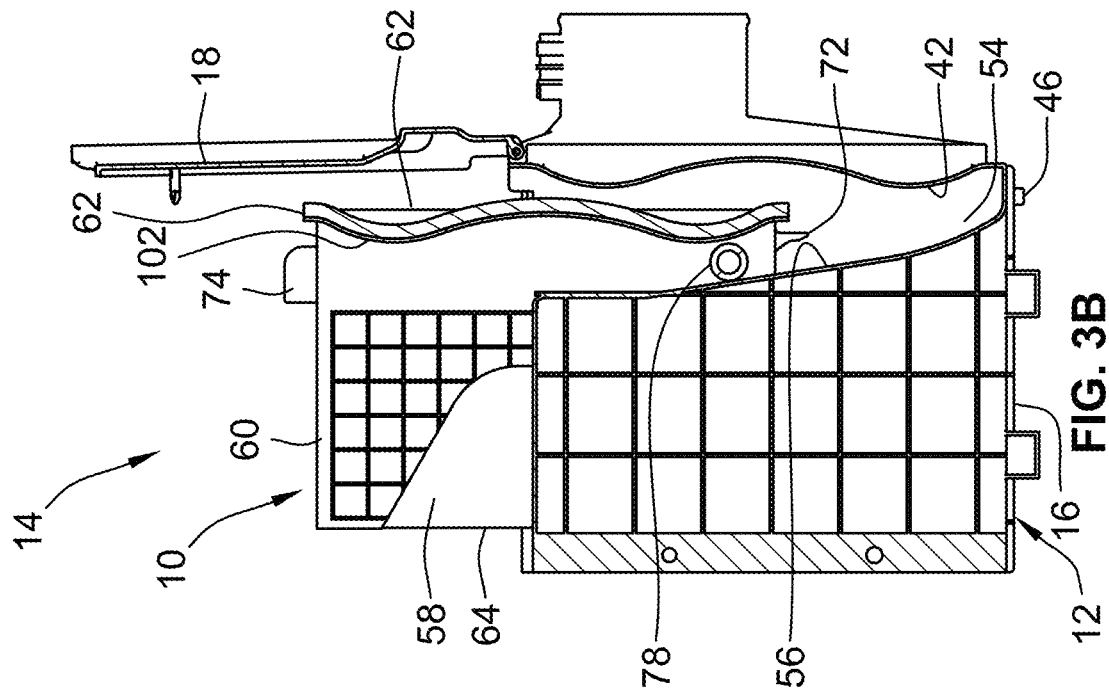
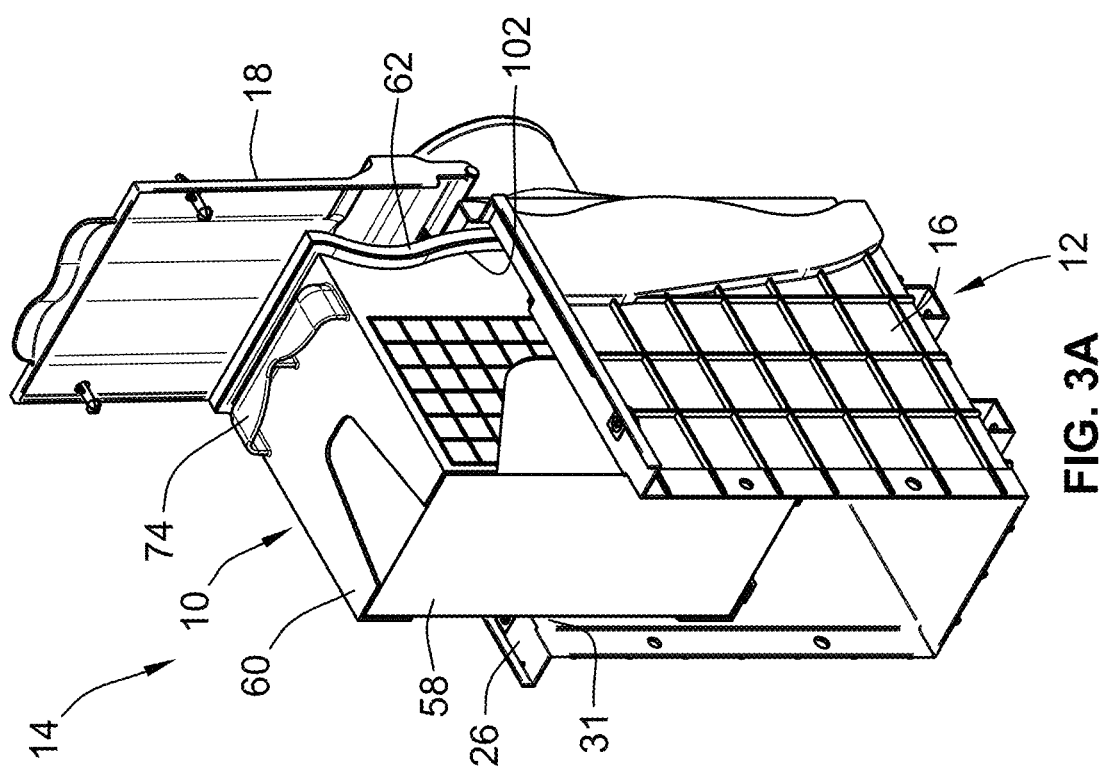

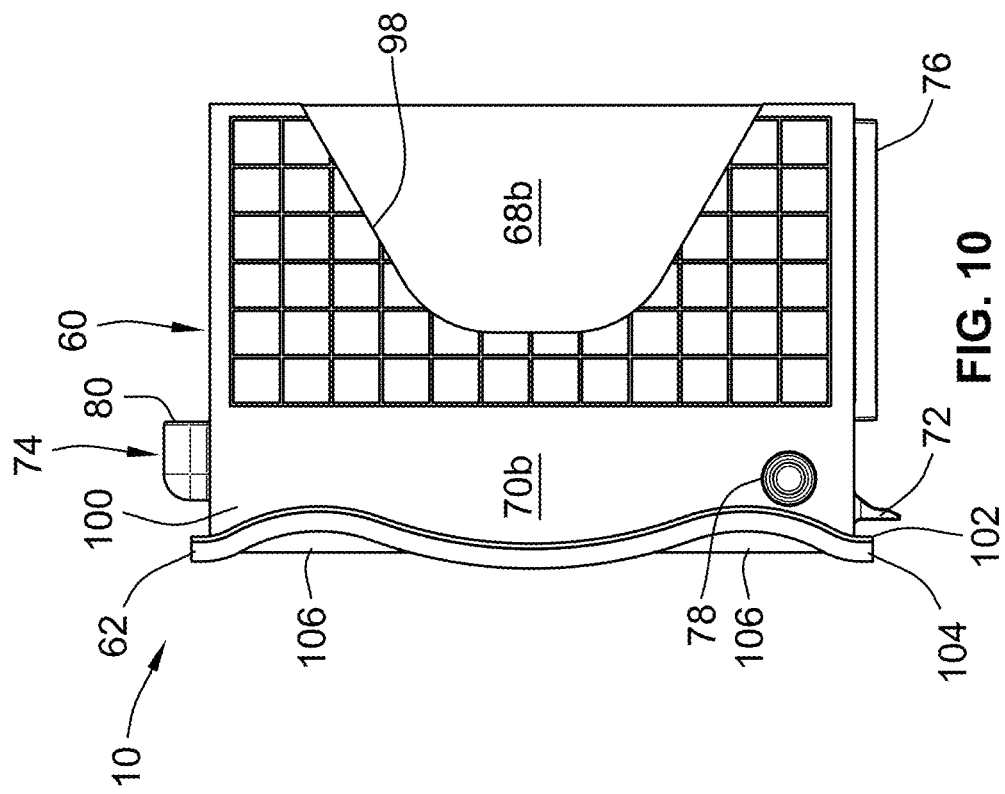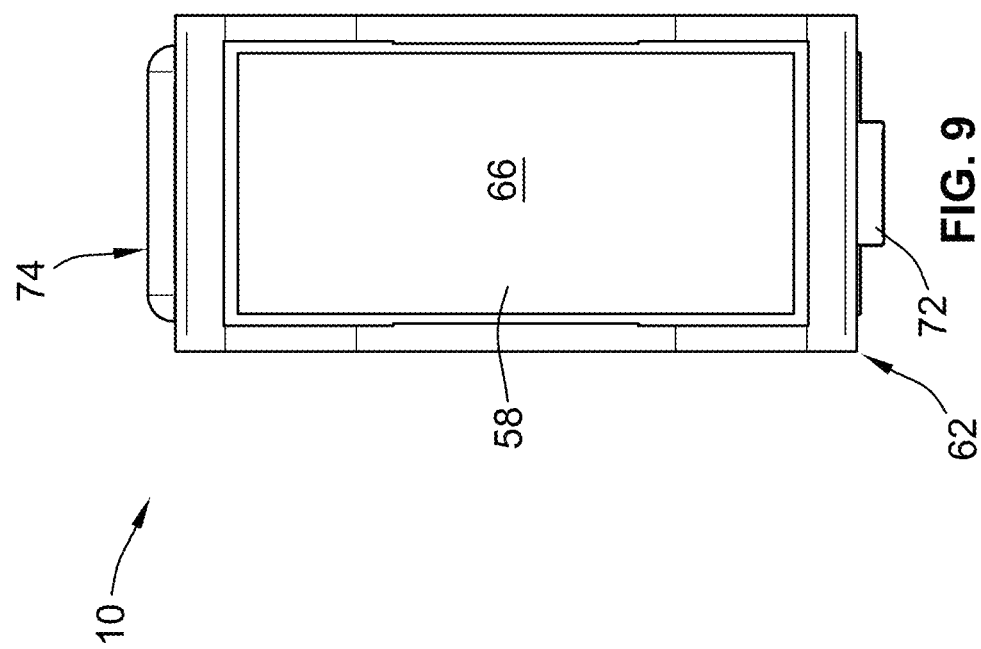

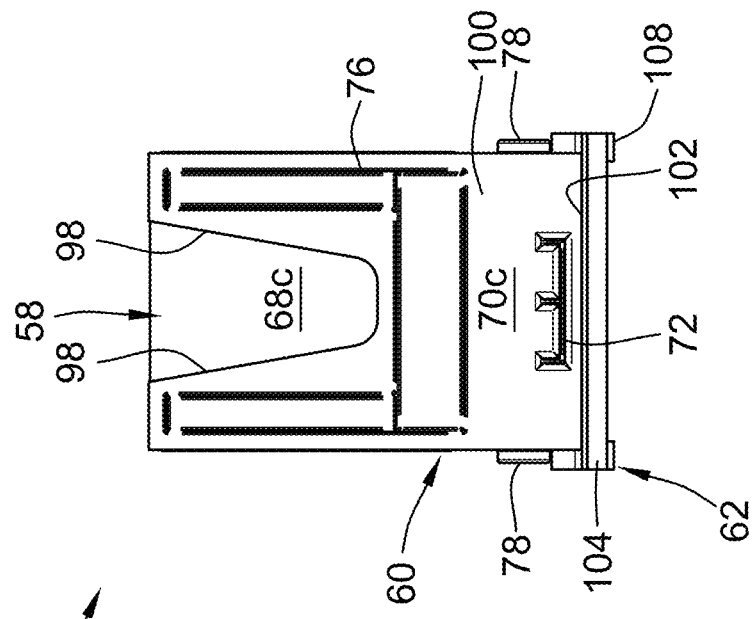
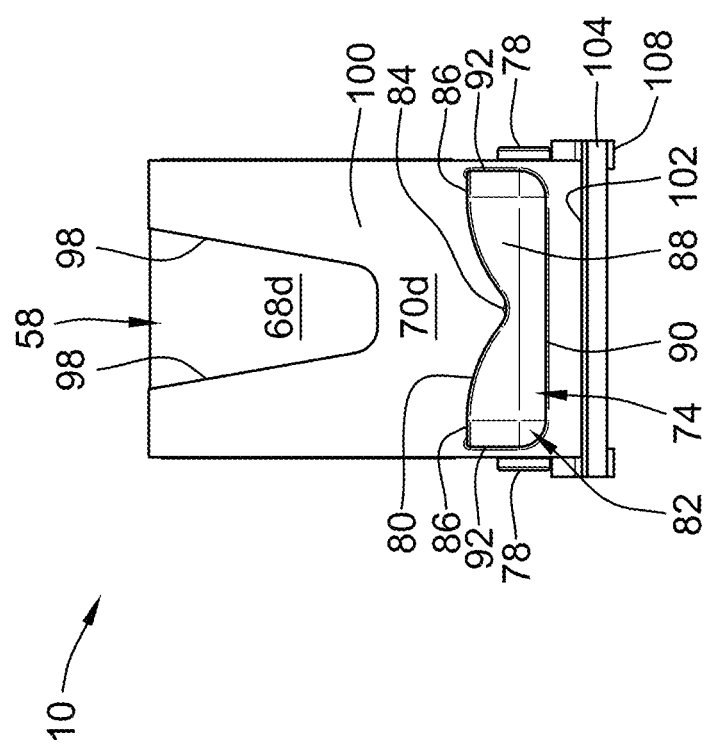
FIG. 11
FIG. 12

NON-CYLINDRICAL FILTER AND SIDE ENTRY AIR CLEANER INCORPORATING THE SAME

CROSS-REFERENCE TO RELATED PATENT APPLICATION

This patent application is a Divisional of U.S. patent application Ser. No. 16/266,988, filed Feb. 4, 2019, which is currently pending, the entire teachings and disclosure of which are incorporated herein by reference thereto. This patent application also claims the benefit of U.S. Provisional Patent Application 62/723,582, filed Aug. 28, 2018, the entire teachings and disclosure of which are incorporated herein by reference thereto.

FIELD OF THE INVENTION

The present invention generally relates to air filter elements and/or air cleaners incorporating the same, and more particularly relates to one or more features associated with air filters to include side entry installation structures to facilitate installation and seal compression and/or seal shape configurations.

BACKGROUND OF THE INVENTION

Filters are commonly employed to remove particulate matter flowing in a fluid stream such as the removal of dust and other particulate from air in the case of an air filter.

In such air filters, a variety of "side entry" air filters currently form the state of the art. For example, EP 1520975 to Maurer et al. entitled "Air Filter Apparatus in the Intake System of an Internal Combustion Engine" and assigned to Man and Hummel GmbH demonstrates a conventional side entry concept, whereby a filter element is installed into a side opening of a housing base that is covered by a pivoting housing lid to secure and seal the filter element in the housing between an inlet and an outlet. During pivoting movement of the lid, it cams and thereby clamps the filter element into sealing relationship with the housing. Several other examples of such side entry filters include such examples disclosed in DE 102015009535 to Menben et al.; DE 102017001268 to Wubbeling; U.S. Pub. No. 2017/0095761 to Knight et al. entitled "Filter Assembly with Cam-Lock Filter Interface"; U.S. Pub. No. 2017/0304760 to Kaufmann et al. entitled "Housing Main Part of a Filter Housing, Filter System, and Pre-Separator Module of a Filter System"; WO 2017/133797 to Klaus-Dieter et al., entitled "Filter Element, Element Frame of a Filter Element, Filter Bellows of a Filter Element and Filter"; U.S. Pat. No. 7,396,375 to Nepsund et al. entitled "Housing and Method of Installation"; U.S. Pat. No. 7,323,029 to Engelland et al. entitled "Housing and Method of Installation"; U.S. Pat. No. 7,655,074 to Nepsund et al. entitled "Housing and Method of Installation"; U.S. Pat. No. 7,682,416 Engelland et al. entitled "Projections and Structure for Engaging Housing"; U.S. Pat. No. 7,905,936 to Coulonvau et al. entitled "Filter Arrangements, Housing Assemblies"; and U.S. Pat. No. 8,048,188 to Widerski et al. entitled "Projections and Structure for Engaging Housings". Some of these designs such as that demonstrated by the EP 1520975 may suffer from space constraint drawbacks in that they require excessive space relative to filtration capacity, or do not afford certain space or shape envelope considerations or flexibility for engine applications where space may be limited or constrained. In other instances, there may be difficulties in either easily or reliably installing the filter, and/or reliability issues or complexities associated with proper installation or sealing of the filter.

Additionally, in the filter art, it is also known that wave seal configurations are provided. For example, the present assignee Parker-Hannifin (or its affiliate) has developed various wave seal configuration concepts for such filters disclosed in the art that include WO 2017/079191 entitled "Wave Seal for Filter Element" and U.S. Pat. No. 8,916,044 entitled "Filter Element Wave Gland Seal"; additionally, other seal configurations are shown, for example, in U.S. Pub. No. 2016/0236128 to Campbell et al. The entire disclosures of these publications are hereby incorporated by reference as such wave seal configurations might optionally or alternatively be used in combination with other features herein. However, for such irregular seal configurations, it is not seen that the art provides for use in such side entry configurations and/or at least not in a reliable and noncomplex manner. Additionally, implementations relative to certain shapes of filter elements or configurations as to construction are not fully provided in the art.

Based on the foregoing, the present invention provides improvements over the state of the art relative to side entry filters, installation or removal structures on filter elements that may be implemented, and/or new seal configurations for filters.

BRIEF SUMMARY OF THE INVENTION

An aspect is directed toward a filter element having a clamping projection with a non-linear bearing.

According to this aspect the filter element can comprise: (a) a filter media pack having an inlet end, an outlet end and an outer periphery extending between the inlet end and the outlet end, the inlet end and the outlet end being separated along a central axis; (b) a frame supporting the filter media pack, the frame including a pivot projection and a clamp projection in spaced apart relationship, the pivot projection and the clamp projection projecting outwardly away from the outer periphery, and (c) a housing seal supported by the frame surrounding the central axis. Additionally, the clamp projection defines a non-linear bearing surface extending in a direction transverse to the central axis. The nonlinear bearing surface is arranged relative to the pivot projection to cooperate for receiving forces in an axial direction of the central axis.

The frame can be quadrilateral including a pair of first sidewalls on opposed sides, and a pair of second sidewalls on opposed sides and extending transversely between the first sidewalls, with the pivot projection and the clamping projecting from the second sidewalls respectively on opposed sides.

For example, the frame can be rectangular with the first sidewalls being longer than the second sidewalls.

The filter element may be provided with the feature of at least one guide projection projecting outwardly away from the outer periphery along at least one of the first sidewalls, with the at least one guide projection being located closer to the pivot projection than the clamp projection, and being arranged to provide for pivot projection guidance.

Preferably, the at least guide projection comprises a pair of guide projections projecting outwardly away from the outer periphery along opposed sides of the first sidewalls, with the guide projections being in the form of slide followers located to be adapted to slide along a housing rail surface.

The filter element may include a feature wherein the frame comprises a plurality of corner regions that extend fully between the inlet end and the outlet end, and recessed saddle regions between corner regions, with the frame defining a continuous quadrilateral border region proximate the housing seal.

The filter element may include a feature wherein the frame comprises a seal support flange projecting radially outward from the first and second sidewalls in surrounding relation of the filter media pack.

The filter element may include a feature wherein the seal support flange and the housing seal are undulating in a direction along the first sidewalls, and are linear in a direction along the second sidewalls.

The filter media pack and the frame can both be quadrilateral, with the frame having a quadrilateral border region, and the filter element can further comprise a quadrilateral filter pack seal sealing between the filter media pack and the quadrilateral border region.

Preferably, the filter media pack is permanently bonded to the frame.

The filter element may include a feature wherein the non-linear bearing surface comprises a centering notch formed centrally and facing toward one of the inlet end and the outlet end, in which the notch projects away from the housing seal.

Preferably, the clamp projection and the pivot projection are located on opposite sides of the frame.

The clamp projection can comprise a block member defining and undercut to provide a handle structure configured for grasping.

The clamp projection can comprise a block member defining a central recess configured for receiving a center camming projection and first and second wings on opposed sides defining portions of the nonlinear bearing surface.

As to such winged structure, the non-linear bearing surface preferably extends continuously through the recess and first and second wings.

As to such clamping projection, the filter element may include a feature wherein the frame defines a peripheral sidewall surrounding the filter media pack, and wherein the block member defines an outer plate portion spaced from the sidewall and connecting plate portions extending radially and connecting between the outer plate portion and the peripheral sidewall. The outer plate portion defines the non-linear bearing surface and defines a centering notch formed centrally and facing toward one of the inlet end and the outlet end, and projecting away from the housing seal to provide the central recess.

For such a filter element, preferably, the frame is a plastic member, the housing seal is a compressible elastomeric material for forming an axial seal, and/or the filter media pack is at least one of a fluted construction and a pleated construction to provide a direct inline flow filter in the direction of the central axis.

It is a further feature of such filter element wherein the non-linear bearing surface is chevron shaped.

Such a filter element can be configured for use with an air cleaner housing having a pivot receptacle in a housing base and a clamping cam surface on a pivotable housing lid. In such instance, the filter element further comprises features of (a) wherein the pivot projection is configured and arranged for engagement with the pivot receptacle, and (b) wherein the clamp projection is configured and arranged for engagement with the clamping cam surface. As such, the filter element is configured to for developing axial clamping force along the central axis for axial sealing of the housing seal, with the housing seal being an axial seal.

A further aspect is directed toward an air cleaner assembly including such filter element, and further comprising: an air cleaner housing including a housing base and a housing lid pivotably connected to the housing base. The housing base defines a filter cavity, an inlet opening and an outlet opening, with the filter cavity in fluid series between the inlet opening and the outlet opening, and a side-entry filter install window defined along an open side of the housing base that opens to the filter cavity. The housing lid is openable and closeable over the inlet opening. The housing base comprises a housing sealing seat and a pivot receptacle. The pivot receptacle is along a closed side of the housing based opposite the open side. The housing seal seat is along the filter cavity and surrounding the central axis when the filter element is installed in the housing base. The housing lid defining a clamping cam surface arranged opposite the pivot receptacle. With this configuration, the filter element includes an installed position within the filter cavity with the pivot projection inserted in the pivot receptacle, with the housing lid in closed position over the filter element. In this installed and closed position, the clamping cam surface is axially engaging the clamp projection along the non-linear bearing surface axially compressing the housing seal against the housing seat.

In an air cleaner assembly, the filter element can include a released position within the filter cavity when the housing lid is pivoted open from the closed position releasing axial compression of the housing seal relative to the installed position. The pivot projection can be inserted in the pivot receptacle with the filter element pivoted away from the housing sealing seat relative to the installed position.

In an air cleaner assembly, the filter element can include a pair of guide projections projecting outwardly away from the outer periphery along opposite sides thereof, and the housing base can define a pair of guide track channels extending from the open end toward the closed end, with the guide track channels defining housing rail surfaces, respectively that extend obliquely relative to the central axis. A relationship is established such that during installation of the filter element through the side-entry filter install window the guide projections slide along the housing rail surfaces, respectively, to guide the pivot projection into the pivot receptacle.

Another aspect is directed toward a method of using the air filter element with the clamping and pivot projections. The method includes: installing the filter element into a side entry window of a housing base so that the pivot projection is received into a pivot receptacle of a housing base; pivoting the filter element into sealing engagement with the housing base by closing a lid over the side entry window which drives the filter element axially by engaging the clamp projection with the lid in clamping cooperation with the pivot projection; and sealing the filter element axially against a housing seating surface defined by the housing base.

The method may also comprise guiding the installing via cooperating guide structures on the housing base and the filter element respectively.

Another aspect is directed toward a filter element having a clamping projection with a chevron shaped.

According to this aspect, a filter element includes a filter media pack having an inlet end, an outlet end and an outer periphery extending between the inlet end and the outlet end, the inlet end and the outlet end being separated along a central axis; a housing seal connected to the filter media pack in surrounding relation of the central axis; and a clamp projection connected to the filter media pack. The clamp projection defines a continuous or non-continuous non-linear bearing surface extending in a direction transverse to the central axis, wherein the non-linear bearing surface is chevron shaped.

In such a filter element, the non-linear bearing surface can comprise a centering notch formed centrally and facing toward one of the inlet end and the outlet end, and projecting away from the housing seal.

Such a filter element may further comprise means spaced away from the clamp projection for cooperating with the clamping notch to facilitating axial compression of the housing seal, which can include an arranged projection, such as a pivot projection.

In such a filter element, the clamp projection can comprise a block member defining and undercut to provide a handle structure configured for grasping.

The clamp projection can comprise a block member defining a central recess configured for receiving a center camming projection and first and second wings on opposed sides defining portions of the nonlinear bearing surface.

To provide the chevron shape, the non-linear bearing surface can extend continuously through the recess and first and second wings.

In such a filter element, preferably a molded plastic frame member in surrounding relation of the filter media pack integrally provides the clamp projection.

Another aspect is directed toward a filter element configured for use with an air cleaner housing having a pivot receptacle in a housing base, with the housing based providing a pair of guide track channels extending from an open end defining a side-entry window toward the closed end, the guide track channels defining housing rail surfaces.

According to such filter element, the filter element can comprise: (a) a filter media pack having an inlet end, an outlet end and an outer periphery extending between the inlet end and the outlet end, with the inlet end and the outlet end being separated along a central axis; (b) a frame supporting the filter media pack to provide a filter element size that is receivable into the side-entry window with, the frame including (i) a pivot projection and (ii) a pair of guide projections in spaced relation to the pivot projection. The guide projections are configured to engage the housing rail surfaces, with the pivot projection configured to engage the pivot receptacle. A housing seal extends around to the filter media pack for providing a seal with the air cleaner housing.

The filter element may further comprise a clamp projection connected to the filter media pack via the frame, with the clamp projection being defined by the frame. The clamp projection can define a non-linear bearing surface extending in a direction transverse to the central axis.

Preferably, such non-linear bearing surface is chevron shaped and configured to interact with a corresponding chevron shaped cam surface of a housing lid.

Another aspect is directed toward a filter element that may preferably be a side-entry filter, with a housing seal arranged about the filter media pack, wherein the housing seal has an axial seal surface that undulates axially over at least a portion of the housing seal.

In such a filter element, the filter media pack can having an inlet end, an outlet end and an outer periphery extending between the inlet end and the outlet end, with the inlet end and the outlet end being separated along a central axis. Further, a frame can support the filter media pack, with the frame being quadrilateral including a pair of first sidewalls on opposed sides, and a pair of second sidewalls on opposed sides and extending transversely between the first sidewalls.

The filter element can have the frame comprising a seal support flange projecting radially outward from the first and second sidewalls in surrounding relation of the filter media pack, with the housing seal in axial abutment contact with the seal support flange.

In an example, the axial seal surface is undulating in a first direction extending along the first sidewalls, and are linear in a second direction along the second sidewalls.

The housing seal can be molded to the frame and to the filter media pack and to provide for undulating configuration can includes axial extending walls of seal material along the outer periphery of the filter media pack along valleys of the axial seal surface in undulated valley regions.

As an alternative to integrally molded in place, the housing seal can be secured to the frame and further comprising an additional seal material separately sealing internally between the frame and the filter media pack.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1A is an isometric view of an air cleaner assembly including an air cleaner housing and an air filter element, in accordance with an embodiment of the present invention, with the air filter element in a fully installed and clamped position with the housing lid in a closed position;

FIG. 1B is a side view of the air cleaner assembly shown in FIG. 1A, with a partial cross-section/cut-away being taken through the housing lid and guide track channel of the air cleaner housing to better show seal and install features;

FIG. 2A is another isometric view of an air cleaner assembly shown in FIG. 1A, but in a partially installed position with the filter element fully installed through the side entry window of the air cleaner housing but not clamped by the housing lid, with the housing lid illustrated in an open position;

FIG. 2B is a side view of the air cleaner assembly shown in the position of FIG. 2A, with a partial cross-section/cut-away being taken through the lid and guide track channel of the air cleaner housing to better show seal and install features;

FIG. 3A is another isometric view of an air cleaner assembly shown in FIG. 1A, but in a partially installed position with the filter element only partially installed into the side entry window of the air cleaner housing and not clamped by the housing lid, with the housing lid illustrated in an open position;

FIG. 3B is a side view of the air cleaner assembly shown in the position of FIG. 3A, with a partial cross-section/cut-away being taken through the lid and guide track channel of the air cleaner housing to better show seal and install features;

FIGS. 7-12 are inlet end, front side, outlet end, back side, left side (e.g. handle and clamp projection side), and right side (e.g. pivot projection side) views, respectively, of the filter element shown in FIG. 5;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As illustrated in the Figures, an embodiment of the present invention has been depicted as a filter element 10. The filter element 10 can be usable with an embodiment of an air cleaner housing 12, the combination of which provides for an air cleaner assembly 14.

Figure 4B:
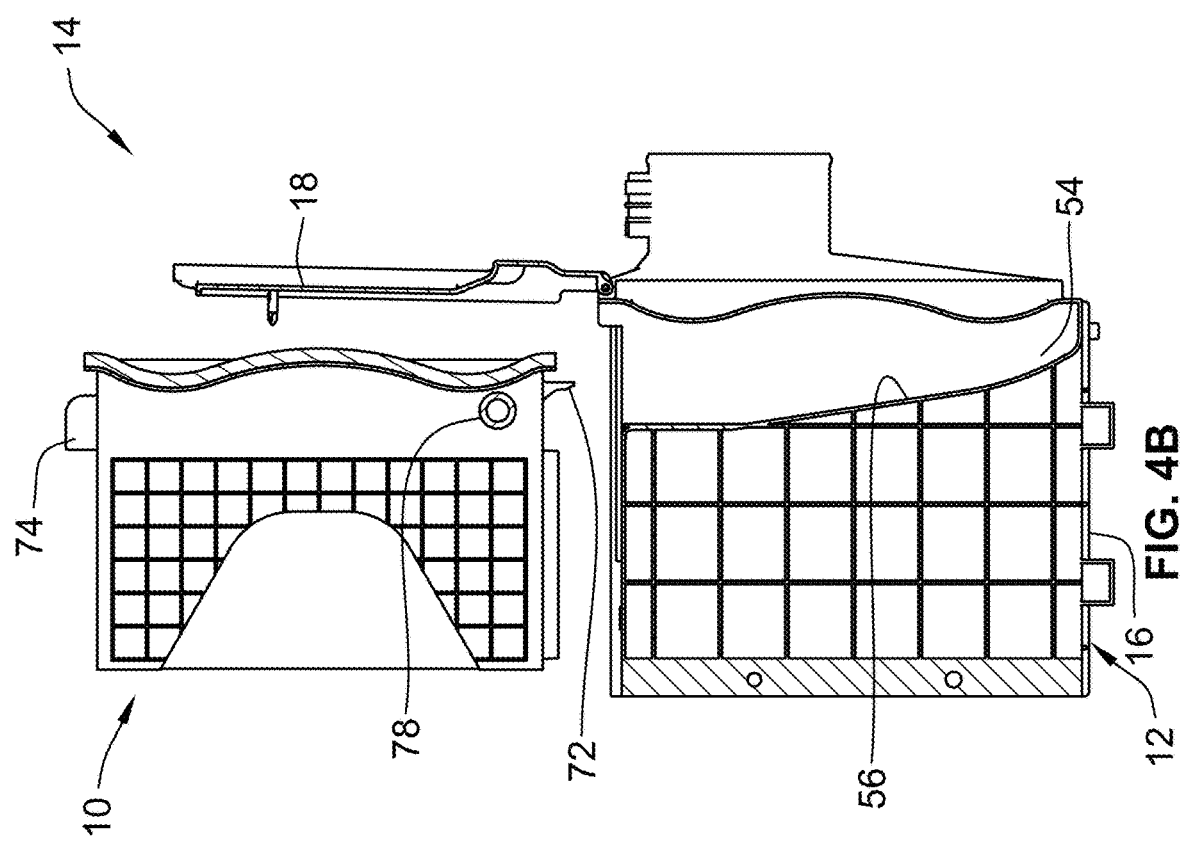
FIG. 4B is a side view of the air cleaner assembly shown in the position of FIG. 4A, with a partial cross-section/cutaway being taken through the lid and guide track channel of the air cleaner housing to better show seal and install features.
Figure 14:
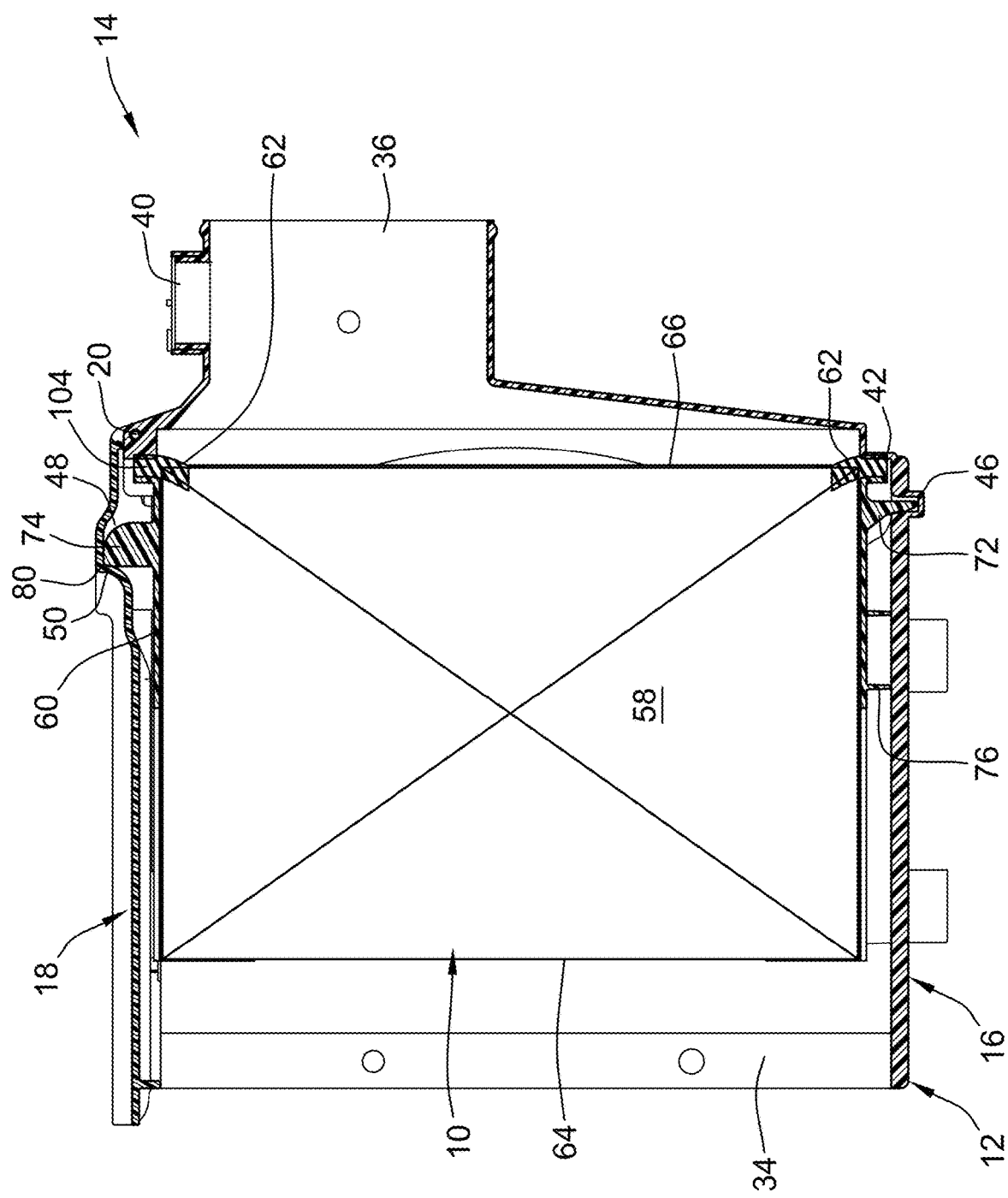
FIG. 14 is a cross-section of the air cleaner assembly taken about line 14-14 in FIG. 1A.
Figure 15:
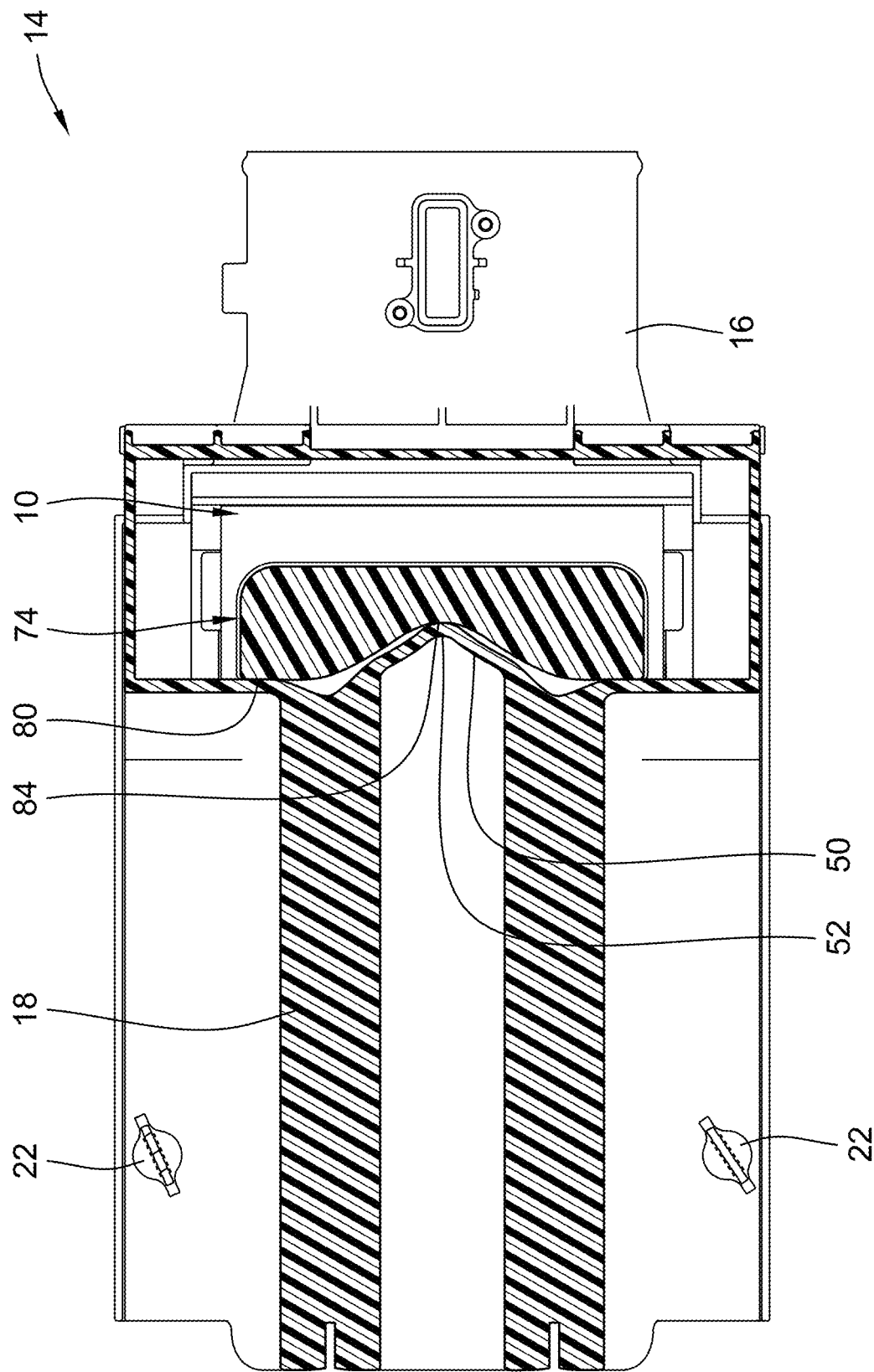
FIG. 15 is a cross-section of the air cleaner assembly taken about line 15-15 in FIG. 1A.
Figure 16:
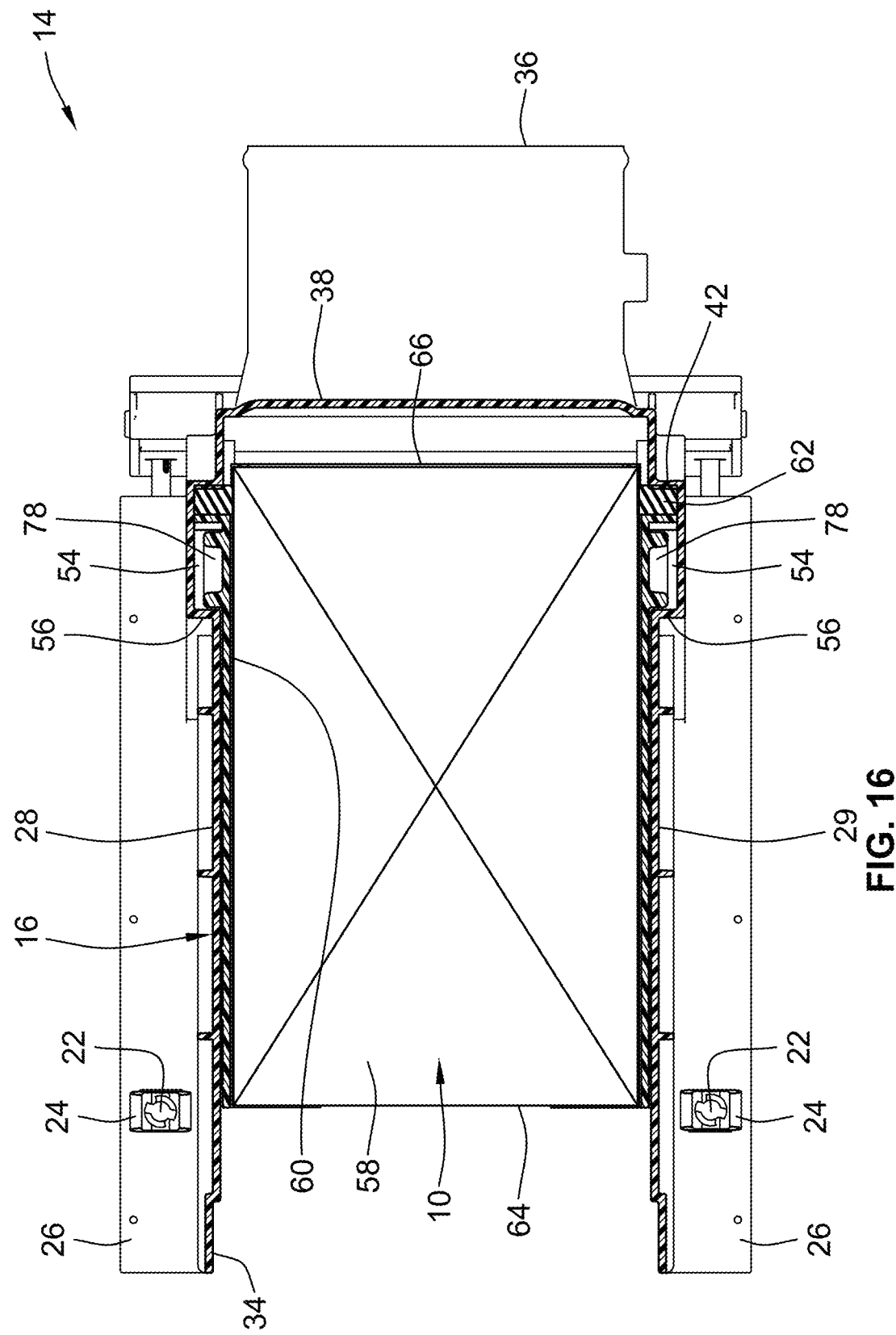
FIG. 16 is a cross-section of the air cleaner assembly taken about line 16-16 in FIG. 1B.

The filter element 10 is better illustrated by itself with respect to FIGS. 5-13, while its use in association with the air cleaner housing 12 is shown, for example, in FIGS. 1A-4B, which show the progressive installation or removal of the filter element 10 from the air cleaner housing 12 (the removal steps being shown progressively from FIGS. 1A-4B; and the insulation being shown in reverse from FIG. 4 to FIG. 1). FIGS. 14-16 additionally illustrate additional interface features of the air filter element 10 within the air cleaner housing 12, for example, the sealing relationship as well as the clamped condition and clamping features, and the guidance interaction features are shown with reference to these cross-sections.

Before turning in greater detail to the filter element 10, attention will first be directed to the air cleaner housing 12 of the air cleaner assembly 14 with reference to FIGS. 1A-4B. The air cleaner housing 12 generally includes a housing base 16 and a housing lid 18 that is pivotably connected to the housing base 16 such as at a hinge 20. Hinge 20 may be provided by a pivot pin that extends through corresponding holes in the lid and the base, respectively and that allows pivoting action therebetween.

The housing lid 18 can be clamped and retained to the housing base 16 in the closed position as shown for example in FIGS. 1A and 1B by suitable fasteners 22, such as thumb screws, other such retainers or clamps that can serve as a fastener to releasably fasten the housing lid 18 to the housing base 16 when desired. The fasteners 22, such as thumbscrews, may be permanently retained to the fastener lid 18 such as shown in FIG. 2A and can threadably install into threaded openings of the lid support flange 26 of the housing base 16.

The housing base 16 generally defines a boxlike quadrilateral casing structure that can comprise a pair of long sidewalls 28 and 29 on opposed sides that are connected by a short closed sidewall 30 extending transversely therebetween. On the side opposite the short closed sidewall 30, there can be an open side 31 that is surrounded by the lid support flange 26 that provides for a side entry filter install window that is sized to receive the filter element 10 for installation and removal 10. The open side 31 thus provides the side entry filter install window that allows access to the internal filter cavity 32 that provides a filtration chamber which receives the air filter element 10.

Preferably, the housing base 16 and/or the corresponding filter element 10 are rectangular in shape to provide the quadrilateral shape.

The filter cavity 32 is in fluid series between an inlet opening 34 and an outlet opening 36, which may be disposed at respective opposed ends of the sidewalls 28-30 (and open side 31), as illustrated in FIGS. 1A-4B. The inlet opening 34 may connect it to an upstream ductwork if employed for an engine air filtration application including, if desired, pre-cleaners which may employ spin tubes to engage in a first stage of filtration.

For example, optional fastening openings (not numbered) are shown on two of the sidewalls that can receive bolts or other such fasteners for upstream ductwork (see e.g. unnumbered holes on long sidewalls proximate inlet opening 34. Additionally, engine mounting structure (not numbered) may also be provided along one or more of the sidewalls such as the short sidewall 30, in the illustrated embodiment.

The outlet opening 36 is shown to be through an otherwise closed end wall 38 of the housing base 16 opposite the open end that provides for the inlet opening 34. The outlet opening 36 may also connect to downstream ductwork such as the air intake of an engine to provide combustion air for a combustion engine, for example.

A sensor port 40 may optionally be provided along the outlet tube portion of the closed end wall 38 that defines the outlet opening 36. Such sensor port 40 can provide for installation of a pressure sensor that may be used to sense pressure differential across the filter element and/or other air pressure or air flow parameters.

Figure 4A:
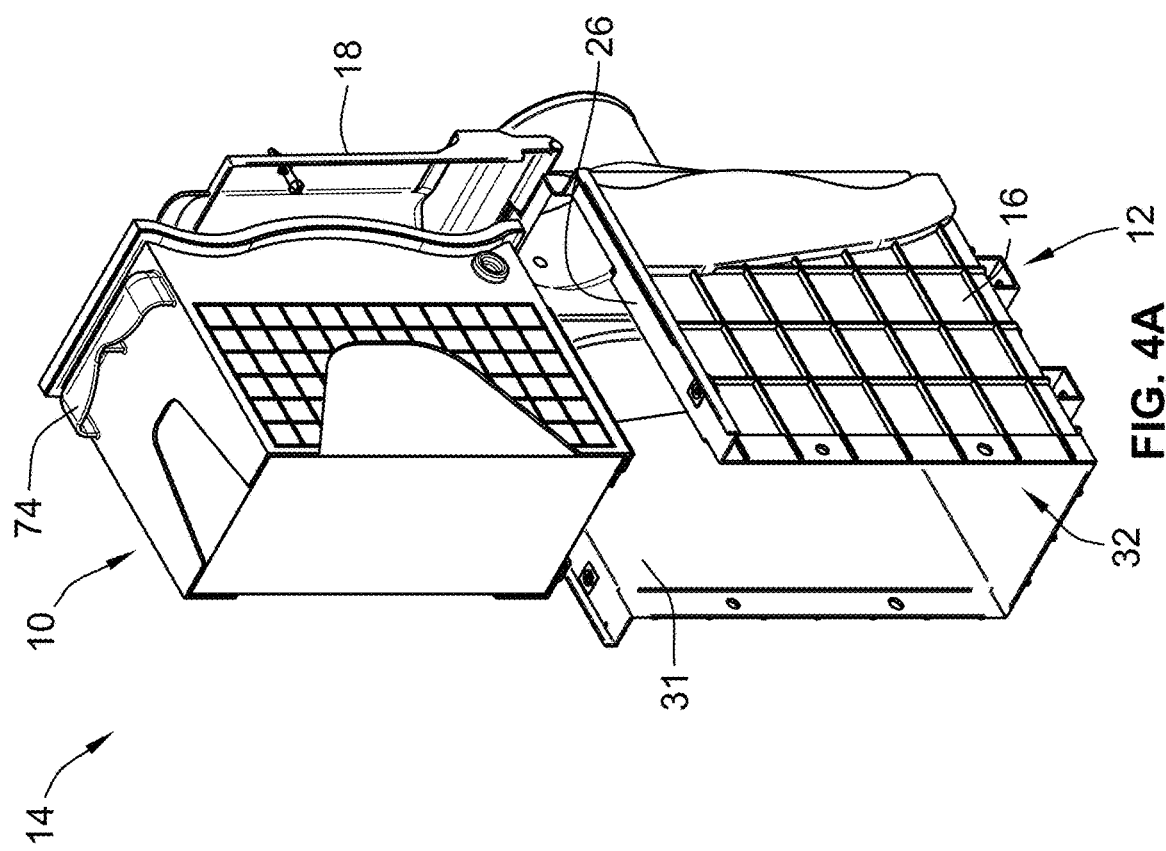
FIG. 4A is another isometric view of an air cleaner assembly shown in FIG. 1A, but in an uninstalled position with the filter element disposed outside but aligned for installation with the side entry window of the air cleaner housing, with the housing lid illustrated in an open position to facilitate filter element installation.
Figure 6:
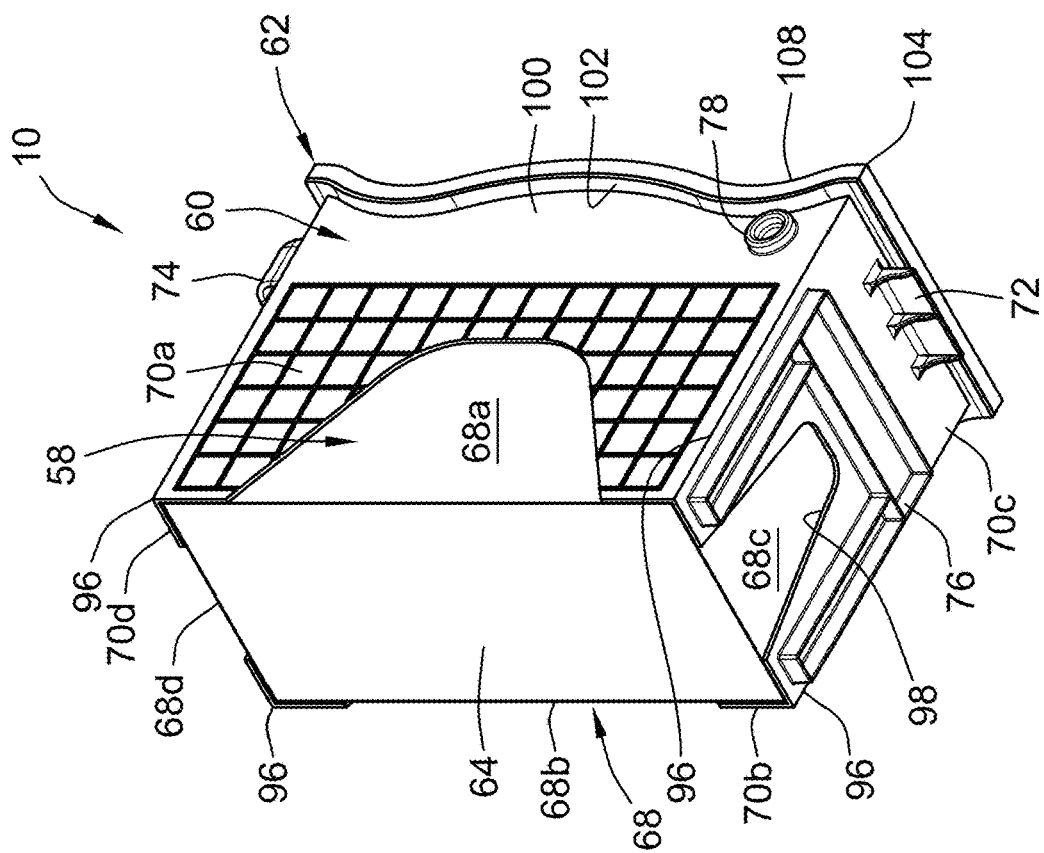
FIG. 6 is another isometric view of the filter element shown in FIG. 5, taken from the inlet face end of the filter element.

As shown in FIGS. 4A and 4B, the air cleaner housing 12 has an open position in which the lid 18 is pivoted open uncovering the side entry filter install window provided by open side 31. This allows for lateral installation of the filter element 10. The filter element 10 can be then pushed laterally (which may be vertically downward) into the air cleaner housing base 16 as shown in FIGS. 3A-3B until it reaches the fully installed position in FIGS. 2A-2B. Thereafter, the housing lid 18 can be rotated and pivoted to the closed position shown in FIGS. 1A and 1B, with the fasteners 22 being manually tightened to secure the housing lid 18 to the housing base 16 to maintain the housing lid in the closed position.

Before turning to details of the filter element 10, some additional features that are particularly useful for interaction with the filter element will be briefly described. In particular, the housing base defines a quadrilateral and preferably rectangularly shaped housing sealing seat 42 that surrounds central axis 41. The sealing seat 42 is preferably at the outlet side of the housing base 16. For example, the sealing seat 42 may be generally defined at or proximate the corner location between the four housing sides (e.g. sidewalls and open side at references 28-31) of the housing base 16 and the closed end wall 38, as illustrated. Sealing seat 42 may generally be in the form of a radially outward extending rectangular flange projecting radially outwardly relative to the central axis 44, as shown. It may be in a plane if flat seals are used or alternatively and has illustrated may take the form of a wave shape if wave type seals are employed.

Further, the housing base may additionally include a pivot receptacle 46 that can be defined by the short closed sidewall, which receives corresponding structure of the filter element 10 when in use to help secure and clamp the filter in place.

The pivot receptacle 46 can take the form of a triangular cavity that narrows in width as it extends away from the central axis to the pivot receptacle base. A wall 46 of the pivot receptacle 46 configured and arranged to provides an axial abutment wall also on the cavity thereof to apply axial pressure when the filter element 10 is wedge into place to provide seal compression.

Further, the housing lid 18 may also define a recess that provides a handle receiver cavity 48 that along one side provides for a clamping cam surface 50. The clamping cam surface 50 can be of a chevron shape to include a central projection 52 that projects toward the sealing seat 42 with the clamping cam surface 50 facing the direction of the sealing seat 42, as illustrated. The clamping cam surface 50 is arranged to apply axial clamping pressure in the direction of the sealing seat 42 when the lid is in the closed position such as shown in FIGS. 1A and 1B, and see additionally FIGS. 14 and 15 additionally for clamping surface engagement.

Further, the housing base 16 can provide means for guiding filter element installation. For example, the housing base 16 may define a pair of recessed guide track channels 54 formed into opposed closed long sidewalls 28 and 29 that may be mirror images of one another. The guide track channels 54 include a larger open entrance located at the open side 36 that narrow in width as the channels progress and extend toward the short closed sidewall 30. The guide track channels may be defined generally between housing rail surfaces 56 along the side closer to the inlet end and by a portion of the sealing seat 42 flange portion that is proximate the outlet side of the housing base. The housing rail surfaces 56 ramp axially forward toward the outlet side as the rail surfaces 56 project from the closed sidewall 30.

Figure 13:
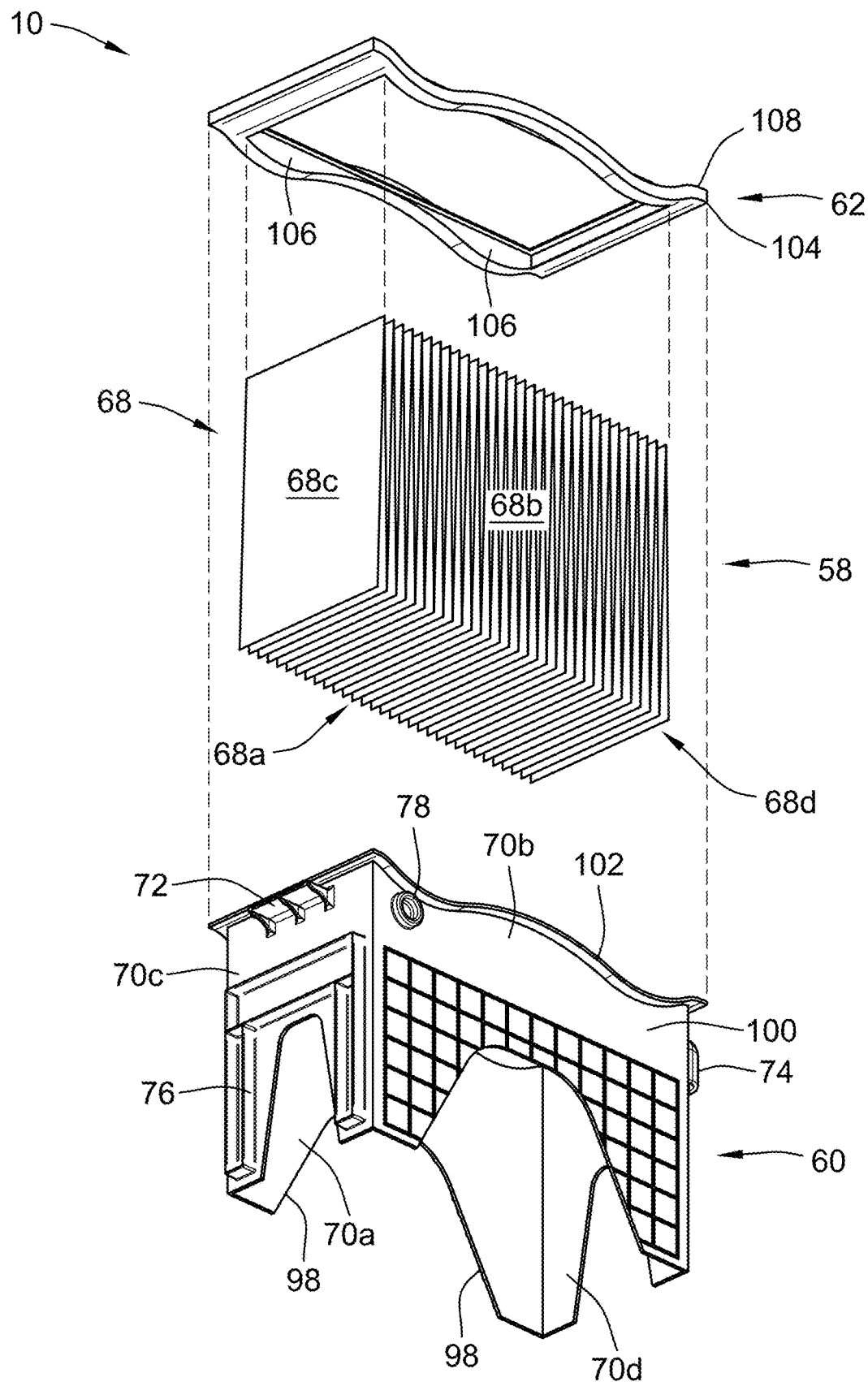
FIG. 13 is an isometric exploded assembly view of the filter element shown in FIG. 5.

Turning now in greater detail to the filter element 10, details thereof can better be seen with references to FIGS. 5-13. As shown in FIG. 13, the filter element preferably includes at least three component parts including a filter media pack 58, a support frame 60 and a housing seal 62, as shown in the exploded assembly view of FIG. 13.

Preferably, the housing seal 62 is integrally molded in place to the filter media pack 58 and to the frame 60 to permanently connect and provide an internal media seal surrounding the media pack and between the media pack 58 and the frame 60 to prevent unfiltered fluid from bypassing along the inside of the frame. Alternatively, additional sealant such as bonding adhesive (e.g. urethane, plastisol, hot melt or other material) may be used to first provide an internal media pack seal between the filter media pack 58 and the frame 60. However, the internal media pack seal as noted above may simply be provided also by an integrally molded in place housing seal 62.

For example, an integrally molded configuration is illustrated in the cross-section of FIG. 14, where it can be seen that the molded in place housing seal 62 is also integrally bonded and embedded into to the media pack 52 as well as the frame 60. However, if the internal media pack seal is provided separately such as by bonding adhesive sealant, then the housing seal 62 may be molded in place or alternatively preformed and then placed upon and preferably adhered to the frame 60.

Also, it is noted that the frame 60 is preferably permanently bonded to the housing seal 62 and the filter media pack 58. However it is also contemplated that the housing seal 62 may simply be bonded to the filter media pack with the frame being in surrounding supporting relation of the filter media pack, but not permanently connected thereto, but potentially as a reusable and removable support structure that is removable without damage to the filter media pack and the housing seal. For example, in such embodiment, the filter media pack 58 and the seal member 62 that is connected thereto would be removably replaceable from the frame 60. In such alternative embodiment however, the frame 60 can still be considered to be part of the filter element in accordance with an embodiment of the present disclosure, even if it is reusable and not necessarily disposed at filter maintenance intervals.

As illustrated, the filter media pack 58 includes an inlet end 64 through which unfiltered air can flow, and an outlet end 66 through which filtered air can flow. Further, an outer periphery 68 extends between the inlet end 64 and the outlet end 68. The outer periphery 68 generally surrounds the central axis 44 which extends through the respective inlet and outlet ends such that the inlet end and the outlet end can be separated along the central axis.

These inlet and outlet ends 64, 66 are preferably planar, but other shapes are possible. For example, these ends provide planar flow faces that can be defined by the pleat tips of a pleated media sheet at opposed ends if pleated media is used (see pleated media shown in FIG. 13).

The outer periphery 68 is preferably a quadrilateral shape and most preferably rectangular, although other quadrilateral shapes such as trapezoidal and the like are possible.

In the illustrated embodiment, the quadrilateral shape provides the filter pack with four sides, which may be rectangular (or other quad shape) to include a first pair of side 68a and 68b; and a second pair of sides extending transversely therebetween including sides 68c and 68d.

In the illustrated embodiment, the long sides are at 68a, 68b and the short sides are at 68c, 68d. Although short and long sides are indicated and illustrated, in a further embodiment may include a square configuration where the width or length of the respective sides are all the same.

The filter media pack 58 is preferably a pleat pack constructed from a single pleated sheet of suitable air filter media, for example, in an embodiment, the filter media pack may be a deep pleated filter media pack that is embossed such as disclosed in U.S. Pub. No. 2018/0214806 to Tate et al., entitled "Filter Media Packs, Methods of Making and Filter Media Presses" and/or international PCT application number PCT/US18/17952 to Tate et al. entitled "Filter Media Packs, Methods of Making, and Ultrasonic Cutting or Welding," the entire disclosures of which are hereby incorporated by reference to illustrate the types of packs, embossments and depths of packs that are contemplated herein.

Preferably, embossments are formed in the filter media pack 58 (see above referenced patent publications/applications for examples and details). For example, embossments are preferably formed in the pleat pack and along one or more pleat panels between the opposed creases in the filter media sheet that define pleat tips at opposed inlet and outlet ends to maintain spacing, when the filter media pack is depleted to a depth of greater than 3 inches and more preferably greater than 6 inches. The depth being defined between the inlet end and the outlet end, which is the location where the folds/creases defining pleat tips are provided.

Alternatively, it is also contemplated that other masses of filter media may be used to include, for example, fluted filter media packs such as described and shown, for example, in U.S. Pub. No. 2014/0260139 entitled "Rectangular Stack Fluted Filter Cartridge" to Merritt, the entire disclosure of which is hereby incorporated by reference to show an alternative embodiment of a filter media pack that may be employed according to an embodiment of the present invention.

Preferably, the spacing between the inlet and outlet ends are relatively deep, such as greater than 3 inches in an embodiment, and more preferably greater than 6 inches. Typically such media depth between inlet and outlet ends is not greater than 12 inches, but some embodiments it may be greater.

Turning to the details of the frame 60, it is shown as preferably matching the shape of the filter media pack 58 and can be sized just larger than that of the filter media pack 58 to receive the filter media pack 58 therein, to thereby support and protect the filter media pack. The frame 60 is preferably in a plastic injection molded and relatively rigid part (e.g. more rigid than the more resilient housing seal 62) to provide structural support and to provide support for compressive forces to the seal 62.

The frame 60 may also be of a quadrilateral and as illustrated a preferably rectangular shape to include a first pair of sidewalls 70a, 70b on opposed sides, and a pair of second sidewalls 70c, 70d that are on opposed sides and extend transversely between the first sidewalls. In this manner, the frame 60 provides a boxlike structure and may provide a border structure for the filter media pack 58 and/or housing seal 62.

In the case of the illustrated embodiment where it is an elongated rectangular structure, the frame 60 is rectangular with the first sidewalls 70a, 70b being longer than the second sidewalls 70c, 70d. In the case of a rectangular shape, first sidewalls 70a, 70b are mutually paralleled and second sidewalls 70c, 70d are mutually parallel and perpendicular to the first sidewalls 70a, 70b.

The frame 60 can also provide the corresponding housing installation and clamping structure to include a pivot projection 72 and a clamp projection 74 that are arranged in spaced apart relationship. Preferably, the pivot projection 72, and the clamp projection 74 are arranged at opposite ends, such as along opposed sidewalls 70c, 70d, respectively, as illustrated. These structures provide for interaction and engagement with the corresponding pivot receptacle 46, and handle receiver cavity 48 and clamping cam surface 50 of the air cleaner housing 12, which can be seen with additional reference to FIG. 1B and FIG. 14-16, as an example.

The pivot projection 72, and clamp projections 74 are preferably integrally molded and unitary with the border structure provided by sidewalls 70a-70d thereby providing the frame as a monolithic one-piece component part, in a preferred embodiment.

Additionally, the sidewall 70c that provides for the pivot projection may additionally include an abutment projection 76 in space relation thereto that is situated to abut and contact the corresponding closed long the sidewall 29 of the air cleaner housing, as can be seen with reference to FIG. 14. This provides additional support and location during installation of the filter element 10 into the air cleaner housing 12.

The frame 60 preferably includes at least one and preferably the cooperating pair of guide projections 78 that project outwardly away from the outer periphery of the filter media pack and along at least one and preferably two of the sidewalls 70a, 70b, as illustrated. The guide projections may be in the form of slide followers that are located and adapted to slide along the housing rail surfaces 56, as illustrated and are sized just smaller than the pair of guide track channels 54 to facilitate receipt therein during installation and removal of the filter element.

Figure 8:
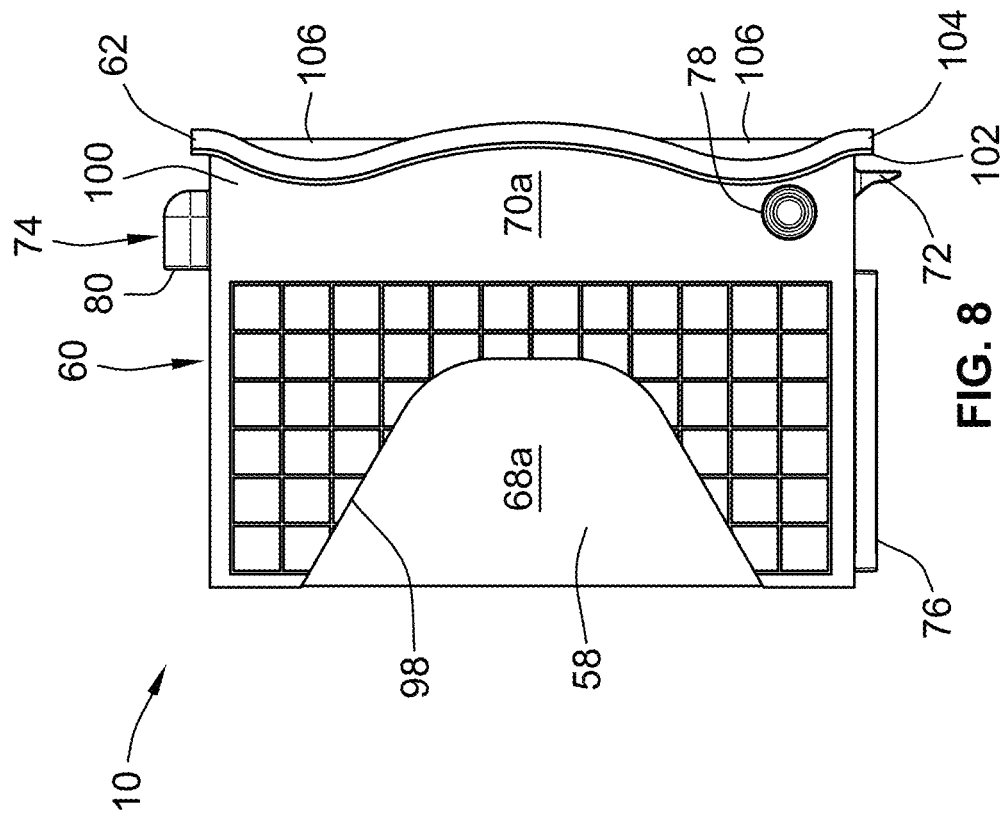
Figure 7:
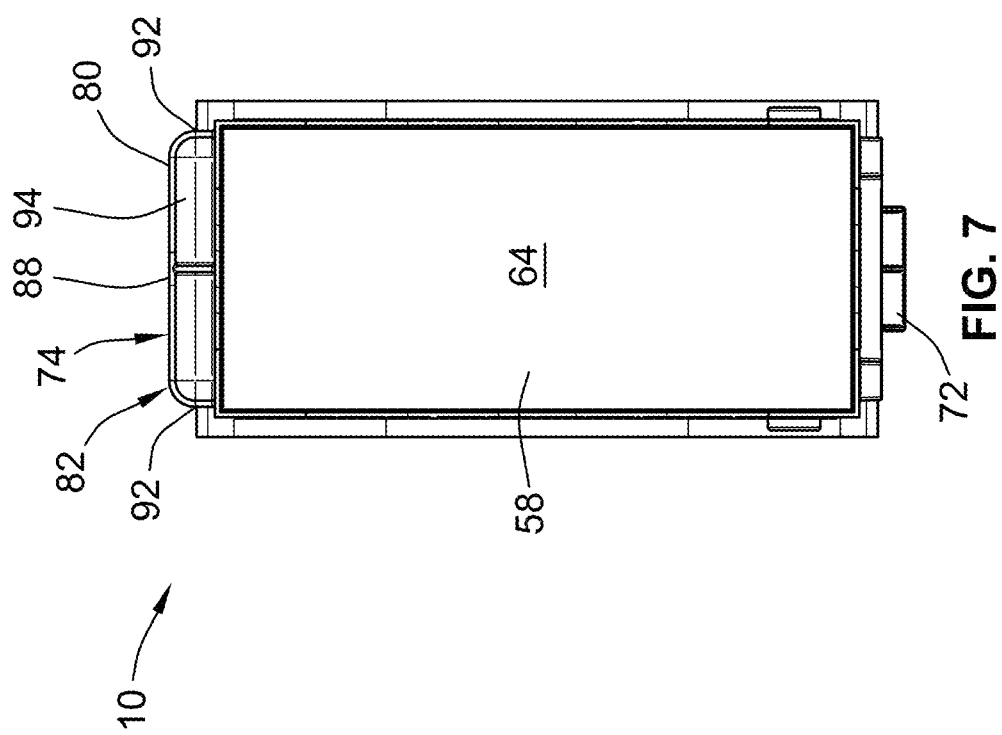

For example, the guide projections 78 may be in the form of circular bosses that project outwardly from opposed sides of the frame 60, as illustrated in FIGS. 13, and FIGS. 8 and 10.

It is additionally noted that in the preferred embodiment that the pivot projection 72 is provided for receipt into the pivot receptacle 46. As illustrated, the pivot projection 72 can be longer in the radially outward direction than it is thick. Further, the pivot projection 72 may taper in thickness from the frame side wall as it projects away therefrom and thus be of a triangular shape as shown. It can be molded conveniently with a flange plate and ribs (e.g. gussets) to provide the structure.

The pivot projection 72 is configured an arranged to engage against the abutment wall provided by the pivot receptacle 41, such as shown in FIGS. 1B and 14, and therefore afford a slight pivoting movement of the filter element during installation, and affords axial sealing pressure to the housing seal 62 to be accomplished if the filter element is installed into the housing.

However, if the pivot projection 72 is omitted, and one or more guide projections are provided, the guide projections could then act as and be considered as the pivot projection. Thus, the guide projections can also be considered to be within the scope of a pivot projection according to an embodiment and according to the independent claims appended hereto unless a claim requires both a separate pivot projection and a separate guide projection distinct therefrom. The reason is that as the filter element is installed into the filter housing, the guide projection 78 will engage and allow pivoting movement upon the housing rail surface 56 in this manner, the guide projection 78 itself can act as a form of pivot projection, and considered to be such a pivot projection according to the present disclosure, especially if the preferred pivot projection 72 is omitted. It is also noted that these guide projections 78, if acting as pivot projections are arranged in spaced apart relationship and are arranged relative to cooperate for receiving forces in the axial direction of the central axis.

Preferably though, the guide projections 78 serve to facilitate and align the filter element 10 during installation into the air cleaner housing 12, which is illustrated for example in FIGS. 1B-4B to demonstrate how the guide projection 78 is received within a corresponding guide track channel 54 and engages upon and slides and follows the housing rail surface 56. In this manner, during installation of the filter element through the side entry filter install window provided by open side 31, the guide projections 78 slide along the housing rail surfaces 56 to guide the pivot projection 72 into the pivot receptacle 46. This engagement can be seen in FIGS. 1B and 2B, as well as FIG. 14. Thus, the pivot receptacle 46 acts as a socket to receive the pivot projection 72 in a manner such that the pivot projection 72 can receive forces in the axial direction of the central axis to assist in applying an axial clamping force to the housing seal 62 when in use.

The clamp projection 74 provides structure for cooperating with the pivot projections 72 to receive forces in the axial direction from the air cleaner housing at opposed ends to facilitate clamping forces upon the housing seal 62 which may be used to create an axial seal engagement between the filter element 10 and the air cleaner housing. The clamp projection 74 defines a non-linear bearing surface 80 to receive such application of axial force from the housing lid 18.

Figure 5:
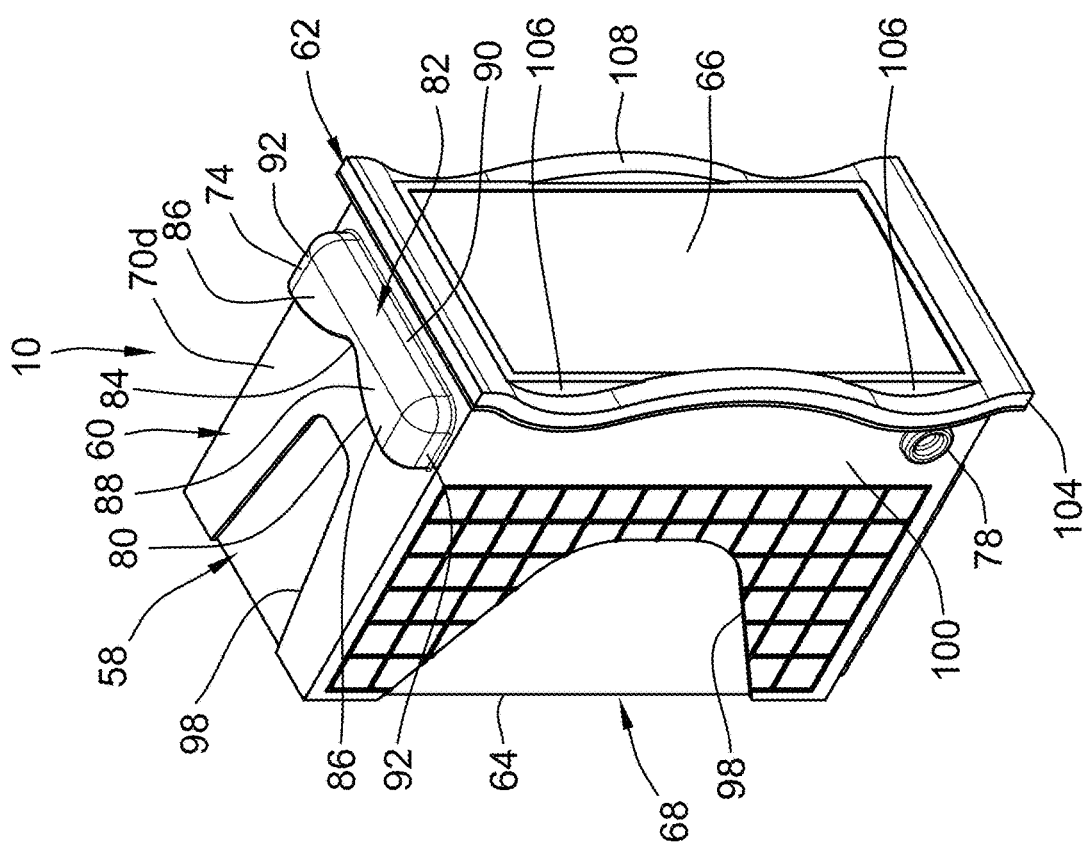
FIG. 5 is an isometric view of the filter element illustrated in the previous FIGS. 1A-4B, taken from the outlet face end of the filter element.

Preferably, the non-linear bearing surface 80 may be chevron shaped, as illustrated for example, in FIG. 2A, FIG. 5, and FIG. 11. This can provide for better alignment or sealing reliability.

As noted above, the clamp projection 74 projects outwardly from the sidewall 70*d* of the frame 60 to thereby provide structure that is situated at the open side 31 of the air cleaner housing base 16 when the filter element is installed therein. This provides the clamp projection 74 with availability to be engaged with and clamped by the corresponding handle receiver cavity 48 with the clamping cam surface 50 of the housing lid 18.

In the illustrated embodiment, the clamp projection 14 comprises an integrally molded plastic hollow block member 82 that defines a central recess such as a centering notch 84 that is arranged to receive the corresponding central projection 52 of the housing lid 18. The centering notch 84 thus can provide part of the non-linear bearing surface 80, along with first and second wings 86 of the block member 82 that provide additional portions of the non-linear bearing surface 80.

Preferably, the non-linear bearing surface 80 extends continuously through the centering notch 84 and the wings 86 to provide for complete contact and engagement between the clamping cam surface 50 and the non-linear bearing surface 80, which is best shown, for example, in FIG. 15. However, interrupted or non-continuous engagement is also contemplated in another embodiment.

The block member may be defined by an outer plate portion 88 that is spaced from the sidewall 70*d* and connecting plate portions, including long plate portion 90 and short plate portions 92 on opposed sides thereof and respectively at opposed wings 86. The long connecting plate portion 90 spans the length and over the distance of both wings 86 and centering notch 84, while the short connecting portions 92 extend from the long connecting plate portion 90 toward the non-linear bearing surface on distal portions of the respective wings 86. The arrangement of the centering notch 84 and non-linear bearing surface 80 is, such that it faces towards the housing seal 62 at one of the inlet end and the outlet end with the centering notch extending into the block member 82 in a direction away from the housing seal 62. Stated another way, the non-linear bearing surface 80 and the centering notch 84 face generally in a direction towards the housing seal 62. With the wings and the centering notch, an overall chevron shape can be provided for engagement with the housing lid 18 and its complementary chevron shaped clamping cam surface 50.

Further, the clamp projection block member 82 as noted is generally hollow in the region underneath the outer plate portion 88 which provides an undercut region 94 that is sized large enough to receive one or more fingers of a service mechanic that can be slidably received therein to facilitate grasping. As a consequence, the clamp projection 74 also may act overall as a handle structure, in addition to acting as a clamping structure.

With the preferred chevron shape, and the centering notch 84, it can be seen that the camming action provided by clamping cam surface 50 when the lid is rotated closed causes automatic centering and better facilitates alignment between the air cleaner housing 12 and the filter element 10 in the closed condition. For example, if the filter element is inserted and not properly aligned (e.g. if the filter element is installed offset closer to one of the long sidewalls 28, 29 of the housing base) then during further installation with the closing of the housing lid 18, the centering provided by centering notch 84 or via the overall non-linear bearing surface with the corresponding non-linear clamping cam surface 50 of the housing facilitates centering to get the filter more properly aligned to better ensure a proper seal between the housing seal 62 and the housing sealing seat 42.

Turning to other details of the illustrated frame 60, it is seen that the frame includes preferably corner regions 96 (e.g. four corner regions in the case of a quadrilateral) that extend fully between the inlet end 64 and the outlet end 66 to provide for adequate protection of the filter media pack 58 of the corners. However, preferably recessed saddle regions 98 are defined in the sidewalls 70*a-b* of the frame 60 that may expose the pack in non-critical regions to provide for additional material cost and weight savings.

Proximate the housing seal 62, preferably the frame 60, also defines a continuous quadrilateral border region 100 that extends continuously in surrounding relation of the filter media pack 58. This border region 100 may further define the corresponding quadrilaterally shaped (e.g. rectangular) seal support flange 102 that projects radially outward relative to the central axis 44 from the sidewalls 70*a*-70*d* in surrounding relation of the filter media pack 58. The seal support flange 102 generally faces and is arranged and matched in size to that of the corresponding sealing seat 42, both in size and configuration and shape, to provide a structure for axially compressing the housing seal 62 against the sealing seat 42.

While the seal support flange and the housing seal 62 may be planar in shape, preferably, these structures may be undulating and form a wave seal. For example, in this embodiment, the seal support flange and the housing seal are undulating in a direction along the longer first sidewalls 70*a*, 70*b*, but are linear and may be planar in a direction of the shorter second sidewalls 70*c*, 70*d*. The linear relationship on the opposed ends where the clamp projection 74 and the pivot projection 72 are provided also provides for the ability of the non-linear bearing surface 80 to act alone in conjunction with the non-linear clamping cam surface 50 to facilitate relative alignment during clamping engagement upon closing of the housing lid 18, with the wave engagement between the seal and housing aligning in the transverse direction.

The seal support flange 102 provides axial abutment contact with the housing seal 62 to provide a rigid support structure that facilitates compression and axial sealing engagement between the housing seal 62 and the sealing seat 42 of the air cleaner housing 12 when the housing lid 18 is closed. During pivoting movement of the housing lid, and with the pivot projection 72 received within the pivot receptacle 46, the clamping cam surface 50 engages upon the corresponding non-linear bearing surface 80 of the filter element to pivot and drive the filter element 10 into sealing engagement with the sealing seat 42 of the air cleaner housing base 16 to facilitate axial sealing engagement. With this arrangement, both the pivot receptacle 46 and the clamping cam surface 50 are providing axial force in the direction of the housing seal 62 against the filter element 10 to ensure sealing relationship. Thus, engagement between the pivot projection 72 and the pivot receptacle 46, at least on the side opposite of the housing seal occurs to allow that the axial force to be applied. A relatively tight fit through compression of the housing seal 62 is facilitated when the pivot projection 72 is installed and received into the pivot receptacle 46. Thereafter, as the housing lid 18 is closed, the filter element 10 is then pivoted by virtue of engagement of the clamping cam surface 50 with the non-linear bearing surface 80 of the filter element to pivot and move the filter element into complete sealing relationship with the housing lid 18 closed.

Further, to provide the wave seal configuration that may project axially into the depth of the filter media around the periphery, the housing seal 62 may include a quadrilateral and preferably rectangular housing sealing flange portion 104 that is shaped, sized and arrange to axially seal against the housing sealing seat 42, but additionally may include axially extending walls 106 of seal material along the outer periphery of the filter media pack and along the valleys formed by the axially outward facing and undulating axially sealing surface 108.

Preferably, this housing seal is provided by an integrally molded form-in-place seal such as being formed by polyurethane or other resilient material. However, it also may be a preformed seal such as a flexible rope gasket made of nitrile, polyurethane, or other suitable seal material that can be placed and preferably glued upon the seal support flange 102, or alternatively a shaped molded preformed gasket in the shape of such a wave seal configuration that is placed and preferably glued upon the seal support flange. In such instance, it is also preferable that in such preformed configurations that axially extending wall portions 106 can be provided to provide for media protection in the valleys of the axial sealing surface 108.

Turning to FIGS. 17-21, an alternative embodiment of an air cleaner assembly 214 is illustrated comprising a filter element 210 and an air cleaner housing 212. The air cleaner assembly 214 is the same and functions the same as that of the first embodiment of FIGS. 1-16 such that the description above is fully applicable to the present embodiment other than as described herein, such that description related to this embodiment will be limited only to the differences. In particular, this air cleaner assembly 214 of the alternative embodiment has: (a) differently configured guide track channels 254 (and housing rail surfaces 256 thereof—see e.g. FIG. 21 cross-section for details along inside of housing) that interact with the filter element guide projections 78 (which are structured the same as the first embodiment such that a like reference numbers is used); and (b) the pivot projection 272 of this filter element 210 and the corresponding pivot receptacle 246 of the air cleaner housing 212 are configured differently.

Figure 19:
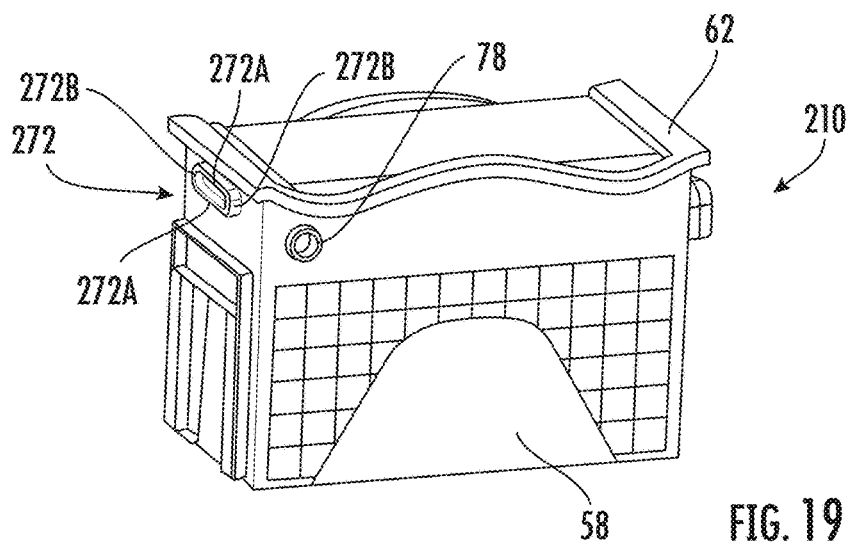
FIG. 19 is an isometric view of the air filter element of the alternative embodiment illustrated in FIG. 17.

In this alternative embodiment, the pivot projection 272 comprises a racetrack shaped ring that includes projection segments as shown in FIG. 19. This pivot projection 272 therefore still projects away from the outer periphery of the filter media pack 58. For example, the pivot projection 272 may include a pair or spaced apart and preferably parallel segment projections 272A, that may be connected by arcuate end projections 272B that may define a loop and ring structure. The central region of this ring structure may be void and define a recess 272C, which provides room to receive the pivot receptacle 246 of the air cleaner housing 212, which is shown as a projection ridge 246A from the inside surface of the air cleaner housing 212. This structure is still a pivot receptacle and in this sense receptacle is meant to include a receiver structure (e.g. a device that receives something), and in this case the receptacle receives adjacently the pivot projection 272 structure for facilitating pivoting. In a similar sense, the pivot projection 272 event though it includes a recess 272C is still a pivot projection as it includes projecting structure and/or surfaces to define the recess 272C. For example, segment projections 272A and 272B, and/or surfaces therefor project to provide pivoting structure.

Figure 20:
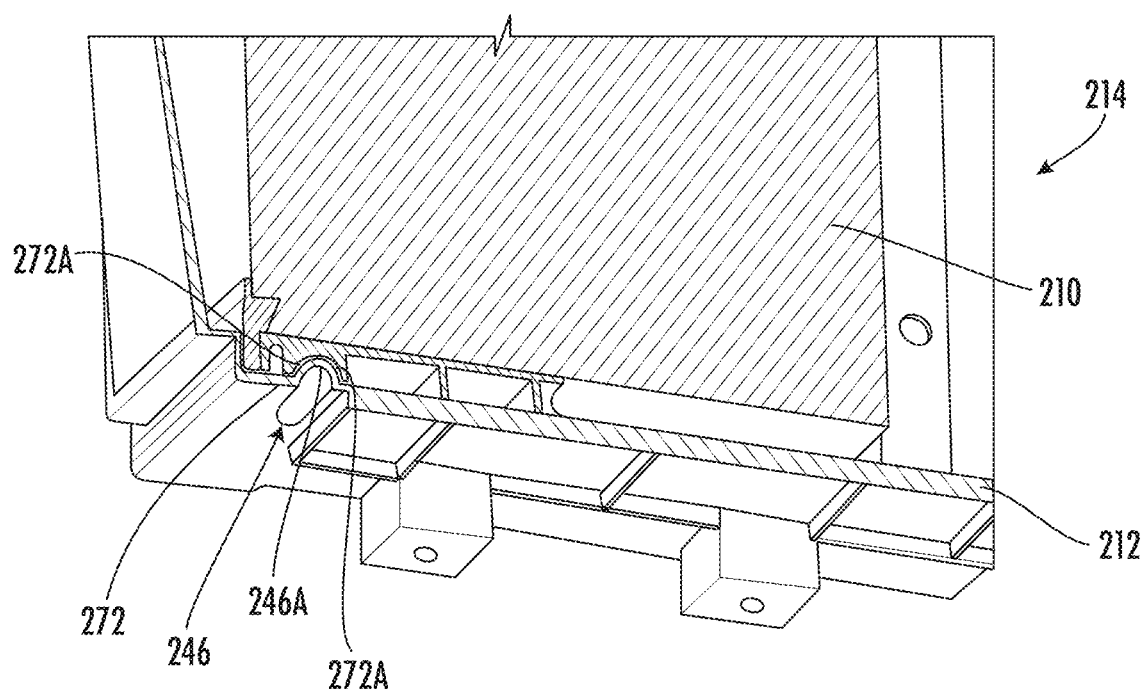
FIG. 20 is a partial, isometric cross sectional view of a combination of the air cleaner housing and the air filter element of the alternative embodiment of FIG. 17 with the air filter element fully installed into the air cleaner housing and being taken about a region through the pivot projection of the air filter element and pivot receptacle of the air cleaner housing.

The interaction and pivoting support that provides the same functionality and result of the first embodiment of the pivot receptacle 246 and the pivot projection 272 is shown better in FIG. 20. Like the first embodiment of FIGS. 1-16, as evident from FIG. 20, the pivot projection 272 is configured and arranged for engagement with the pivot receptacle 246. With the clamp projection configured and arranged for engagement with the clamping cam surface being the same in this alternative embodiment, the filter element 210 is configured to for developing axial clamping force along the central axis for axial sealing of the housing seal 62, and the housing seal can also similarly be an axial seal.

Figure 17:
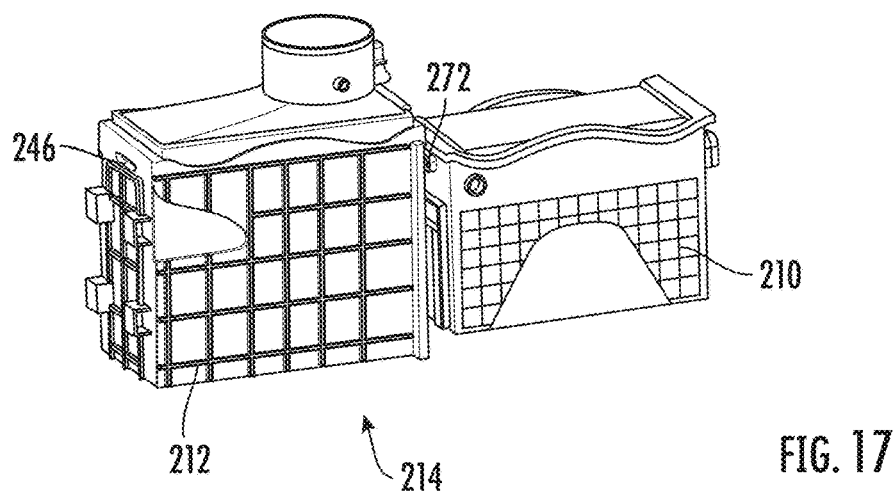
FIG. 17 is an isometric view of an air cleaner housing and an air filter element, in accordance with an alternative embodiment of the present invention.
Figure 18:
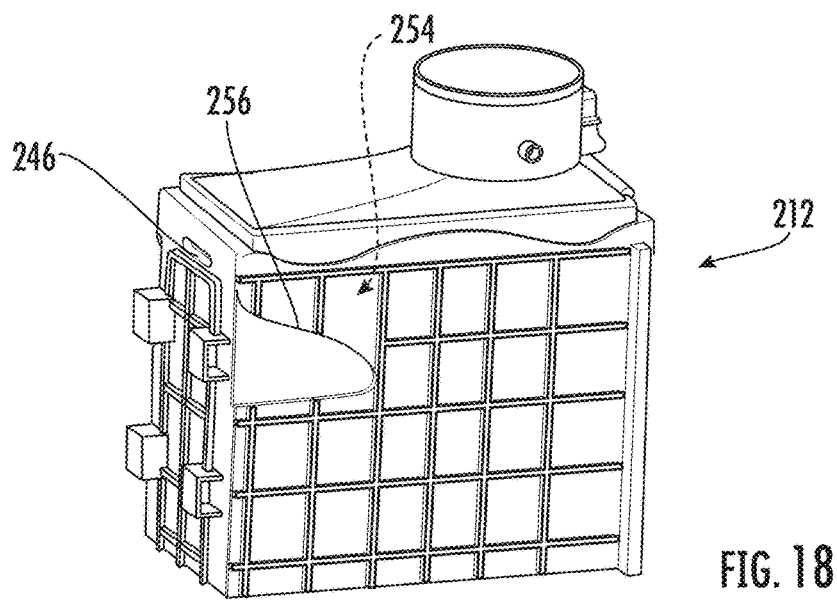
FIG. 18 is an isometric view of the air cleaner housing of the alternative embodiment illustrated in FIG. 17.
Figure 21:
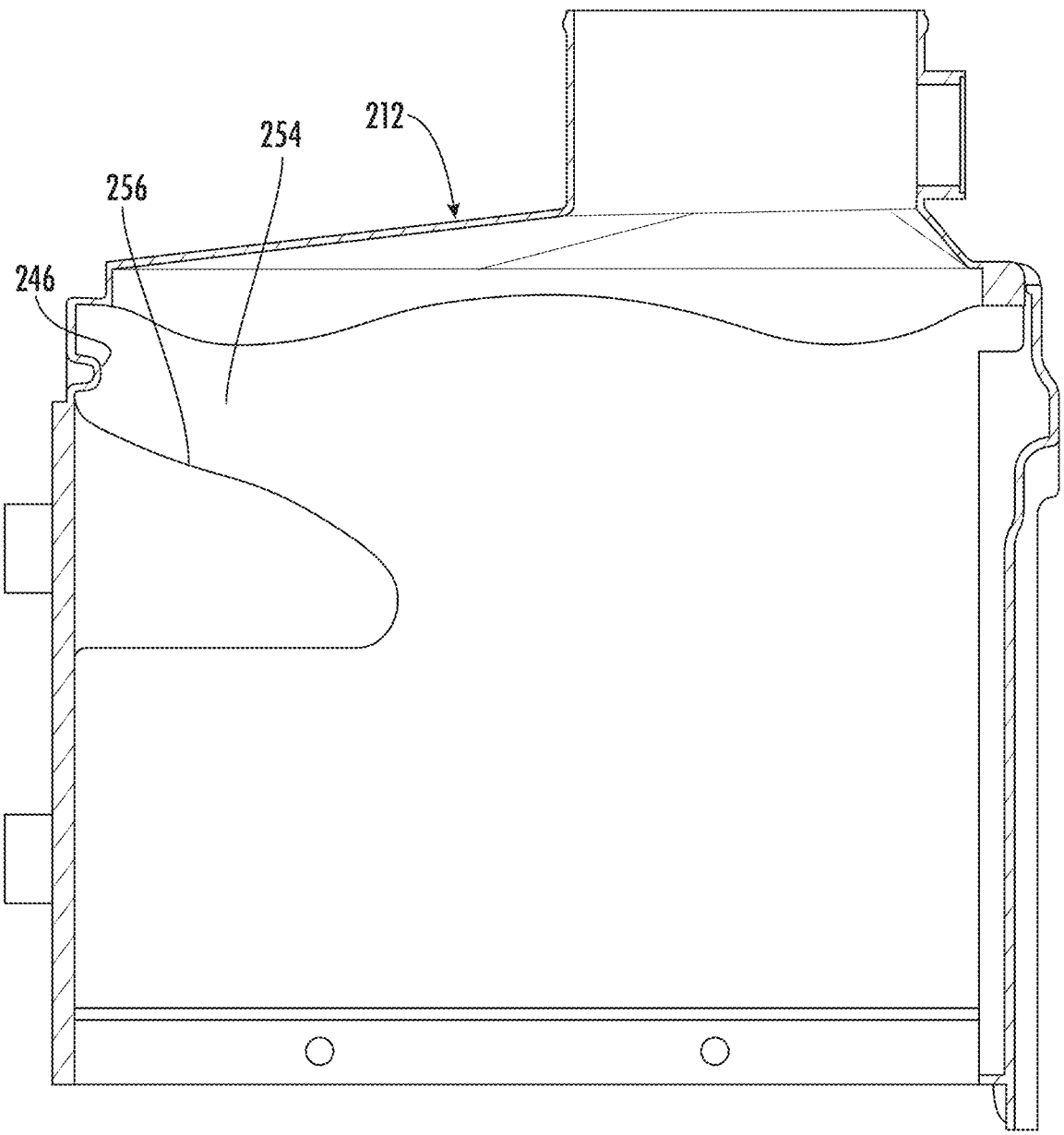
FIG. 21 is a cross-sectional view of the air cleaner housing shown in FIG. 18 through an axially extending section plane that passes thorough the inlet and outlet, the cover and the pivot receptacle, to better illustrate structural features of the alternative pivot receptacle and track channel and rail configuration (which are mirror images on opposite halves of the housing).

Turning to FIGS. 17, 18 and 21, it can be seen that the structure that projects inwardly from the housing to provide guide channels 254 that like the first embodiment extend between the open end and the closed end, with corresponding guide rails 256 to engage and interact with the guide projections 78 on the housing. Like the first embodiment, two symmetrical guide channels 254 and rails 256 would be provided on opposite sides (the symmetrical or mirror image other side is not illustrated in this alternative embodiment, but readily evident from the Figures). In each embodiment, the guide channels and rails extend at least partially between the open end and the opposite closed end of the housing; however in the first embodiment of FIGS. 1-16, the extend of the structure may be fully between as shown whereas in the alternative embodiment shown in FIGS. 17, 18 and 21, it is only partially between rather than fully. An advantage of the alternative embodiment may be that a shorter inset ramp that interfaces with the air filter element for pushing the bottom seal face against the housing wave surface. In other words, this may allow easier installation and manipulation by the service mechanic of the filter element during installation as the engagement and alignment need only to occur toward the end of install movement, whereas more complete guiding movement is an advantage of the earlier first embodiment.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
   a filter media pack having an inlet end, an outlet end and an outer periphery extending between the inlet end and the outlet end, the inlet end and the outlet end being separated along a central axis;
   a frame supporting the filter media pack, wherein the frame is quadrilateral including a pair of first sidewalls on opposed sides, and a pair of second sidewalls on opposed sides and extending transversely between the first sidewalls; and
   a housing seal arranged about the filter media pack, wherein the housing seal has an axial seal surface for forming an axial seal that undulates axially to form valleys over at least a portion of the housing seal; and
   wherein the axial seal surface is undulating in a first direction extending along the first sidewalls and is linear in a second direction along the second sidewalls.

2. The filter element of claim 1, wherein the frame comprises a seal support flange projecting radially outward from the first and second sidewalls in surrounding relation of the filter media pack, the housing seal in axial abutment contact with the seal support flange.

3. The filter element of claim 1, wherein the housing seal is molded to the frame and to the filter media pack and includes axially extending walls of seal material along the outer periphery of the filter media pack along the valleys of the axial seal surface in undulated valley regions.

4. The filter element of claim 1, wherein the housing seal is secured to the frame and further comprising an additional seal material separately sealing internally between the frame and the filter media pack.

5. The filter element of claim 1, wherein the combination of the filter media pack, the frame and the housing seal provide a side-entry filter.

6. The filter element of claim 1, further comprising a clamp projection connected to the filter media pack, the clamp projection defines a continuous or non-continuous non-linear bearing surface extending in a direction transverse to the central axis.

7. The filter element of claim 6, wherein the non-linear bearing surface is chevron shaped and comprises a centering notch formed centrally and facing toward one of the inlet end and the outlet end, and projecting away from the housing seal.

8. The filter element of claim 6, further comprising means spaced away from the clamp projection for cooperating with a clamping notch to facilitating axial compression of the housing seal.

9. The filter element of claim 6, wherein the clamp projection comprises a block member defining an undercut to provide a handle structure configured for grasping.

10. The filter element of claim 6, wherein the clamp projection comprises a block member defining a central recess configured for receiving a center camming projection and first and second wings on opposed sides defining portions of the nonlinear bearing surface.

11. An air cleaner assembly including the filter element of claim 6, and further comprising:
    an air cleaner housing including a housing base and a housing lid pivotably connected to the housing base, the housing base defining a filter cavity, an inlet opening and an outlet opening, the filter cavity in fluid series between the inlet opening and the outlet opening, and a side-entry filter install window defined along an open side of the housing base that opens to the filter cavity, the housing lid being openable and closeable over the inlet opening;
    the housing base comprising a housing sealing seat, the housing seal seat along the filter cavity and surrounding the central axis when the filter element is installed in the housing base;
    the housing lid defining a clamping cam surface;
    the filter element including an installed position within the filter cavity with the housing lid in closed position over the filter element wherein the clamping cam surface is axially engaging the clamp projection along the non-linear bearing surface axially compressing the housing seal against the housing seat.

12. The filter element of claim 1, wherein the filter element comprises a pair of guide projections projecting outwardly away from the outer periphery along opposed sides of the first sidewalls, the guide projections being in the form of slide followers located to be adapted to slide along a housing rail surface.

13. The filter element of claim 1, wherein the filter element includes a pair of guide projections projecting outwardly away from the outer periphery along opposite sides thereof.

14. An air cleaner assembly including the filter element of claim 13, wherein the housing base defines a pair of guide track channels extending at least partially between an open end and a closed end, the guide track channels defining housing rail surfaces, respectively that extend obliquely relative to the central axis such that during installation of the filter element through a side-entry filter install window the guide projections slide along the housing rail surfaces, respectively.

15. A filter element comprising:
a filter media pack having an inlet end, an outlet end and an outer periphery extending between the inlet end and the outlet end, the inlet end and the outlet end being separated along a central axis;
a housing seal arranged about the filter media pack, wherein the housing seal has an axial seal surface for forming an axial seal that undulates axially over at least a portion of the housing seal, wherein the axial seal surface is undulating in a first direction extending along first housing seal segments in spaced relation and is linear in a second direction along second housing seal segments in space relation, the first direction being transverse to the second direction.

16. The filter element of claim 15, wherein the filter element includes a pair of guide projections projecting outwardly away from the outer periphery along opposite sides thereof providing a pair of housing slide followers for mounting of the filter element.

17. The filter element of claim 15, further comprising a clamp projection connected to the filter media pack, the clamp projection defines a continuous or non-continuous non-linear bearing surface extending in a direction transverse to the central axis.

18. The filter element of claim 17, wherein the non-linear bearing surface comprises a centering notch formed centrally and facing toward one of the inlet end and the outlet end, and projecting away from the housing seal.

19. The filter element of claim 15, further comprising a frame supporting the filter media pack, wherein the frame is quadrilateral including a pair of first sidewalls on opposed sides, and a pair of second sidewalls on opposed sides and extending transversely between the first sidewalls.

20. The filter element of claim 19, wherein the frame comprises a seal support flange projecting radially outward from the first and second sidewalls in surrounding relation of the filter media pack, the housing seal in axial abutment contact with the seal support flange.

* * * * *